United States Patent
Niemeyer et al.

(10) Patent No.: US 12,122,076 B2
(45) Date of Patent: Oct. 22, 2024

(54) METHOD FOR PRODUCING MOULDED PARTS FROM PARTICLE FOAMS

(71) Applicant: Teubert-Wörthwein GbR, Blumberg (DE)

(72) Inventors: Gerd Niemeyer, Feldkirch (AT); Wolfgang Teubert, Blumberg (DE); Hans Wörthwein, Cleebronn (DE)

(73) Assignee: Wörthwein-Teubert GbR (DE)

( * ) Notice: Subject to any disclaimer, the term of this patent is extended or adjusted under 35 U.S.C. 154(b) by 278 days.

(21) Appl. No.: 17/577,427

(22) Filed: Jan. 18, 2022

(65) Prior Publication Data
US 2022/0134611 A1  May 5, 2022

Related U.S. Application Data

(63) Continuation of application No. PCT/IB2020/056737, filed on Jul. 17, 2020.

(30) Foreign Application Priority Data

Jul. 18, 2019  (DE) .......................... 102019119488.1

(51) Int. Cl.
| | |
|---|---|
| B29C 44/44 | (2006.01) |
| B29C 35/08 | (2006.01) |
| B29C 44/34 | (2006.01) |
| B29C 67/20 | (2006.01) |

(52) U.S. Cl.
CPC ........ B29C 44/445 (2013.01); B29C 35/0805 (2013.01); B29C 44/3461 (2013.01); B29C 67/205 (2013.01)

(58) Field of Classification Search
CPC .............. B29C 44/445; B29C 44/3461; B29C 35/0805; B29C 67/205
See application file for complete search history.

(56) References Cited

FOREIGN PATENT DOCUMENTS

| | | | | |
|---|---|---|---|---|
| EP | 2050770 A1 | * | 4/2009 | ............ C08F 255/00 |
| EP | 2937379 A1 | * | 10/2015 | ......... B29C 44/3461 |

* cited by examiner

*Primary Examiner* — Daniel McNally

(57) ABSTRACT

A process for producing shaped parts from particle foams comprising providing particle foam particles, wetting the particle foam particles with an aqueous emulsion of at least one polyolefin and thereby obtaining functionalisable particle foam particles, drying the wetted and functionalisable particle foam particles, shaping the functionalisable particle foam particles, heating the shaped functionalisable particle foam particles to a temperature below the melting range of the particle foam particles and thereby functionalising the shaped functionalisable particle foam particles, heating the shaped, functionalisable particle foam particles to a temperature below the melting range of the particle foam particles and thereby functionalising the shaped, functionalisable particle foam particles, wherein the particle foam particles are bonded together, and cooling and thereby obtaining the particle foam moulding, wherein the aqueous emulsion of the at least one polyolefin is an aqueous emulsion comprising at least one polyolefin converted to the liquid state with an anhydride of an unsaturated carboxylic acid and modified with methacrylic acid ester copolymers.

15 Claims, 32 Drawing Sheets

METHOD FOR PRODUCING MOULDED PARTS FROM PARTICLE FOAMS

BACKGROUND INFORMATION

Field of the Invention

The present invention relates to a method of manufacturing moulded parts from particle foams and to particle foam moulded parts themselves.

Discussion of Prior Art

Moulded parts made of particle foams and their manufacturing processes are known per se. For example, moulded parts made of EPP (expanded polypropylene) are produced according to processes known in the prior art by means of steam at a temperature of about 160° C. in aluminium tools. The tools must be more stable than comparable tools for the production of moulded parts made of expanded polystyrene (EPS), for example. The production itself can be described as a kind of sintering process, in which the individual EPP particles, after filling a mould, are heated and softened by means of steam, whereby the air enclosed in the particles develops a foaming pressure, whereby the particles are finally sintered into a moulded part.

For such and comparable processes, the handling of steam and the associated high pressure, as well as the need for cavities to introduce the steam, consequently require more complex equipment for moulded part production, which requires greater investment. Therefore, from an economic point of view, the known processes are only suitable for large series. A small series of moulded parts made of particle foams or even the production of individual pieces is not economically feasible. Similarly, composite materials (sandwiches) cannot be produced in a single operation with this technology.

The present inventors had already developed a process for the production of EPP mouldings, which is described in EP 2 937 379 B1. This process manages with moderate process conditions, i.e. essentially pressureless and at temperatures below the melting range of EPP. In this process, the EPP particles are wetted with an aqueous emulsion of at least one polyolefin modified with chlorine and maleic anhydride and thereby functionalised so that they are given a shape and bonded together (but not sintered or welded) by moderate heating.

The process developed by the present inventors and described in EP 2 937 379 B1 has proved to be fundamentally advantageous in practice. In the meantime, however, a disadvantage has been identified in the fact that the aqueous emulsion of a polyolefin used there contains chlorine, which leads to problems, for example, with recyclability or due to the presence of small amounts of chloroform.

Apart from large-scale applications where the use of conventional processes involving the application of hot steam makes sense, for example in automotive construction and for high-quality reusable packaging, particle foams can, however, continue to be used increasingly for special areas of application. Examples include the areas of sports, logistics (storage and transport of mechanically sensitive components), furniture and design (prototype construction) or model making (customised products). Therefore, in addition to an increased demand for small series of particle foam moulded parts or individual pieces, there is also a demand for composite materials made of particle foams and other materials that can be produced easily and quickly in large series, but which do not have the aforementioned disadvantages of the chlorine-containing activator. These processes and products are also highly interesting for the automotive sector (keyword e-mobility), especially with regard to insulation and weight savings.

BRIEF SUMMARY OF THE INVENTION

Based on these specific disadvantages of the prior art, the present invention is based on the task of specifying an improved process with which, on the one hand, small series and individual pieces of particle foam mouldings and, on the other hand, large series of composite materials made of particle foams and other materials can be produced simply and inexpensively. A further aim is simple and inexpensive particle foam mouldings and particle foam composite mouldings themselves.

This task is solved in a first aspect of the present invention by a method for producing moulded parts from particle foams, comprising the steps of:
(a) providing particle foam particles,
b) wetting the particle foam particles with an aqueous emulsion of at least one polyolefin and thereby obtaining functionalisable particle foam particles,
c) drying the wetted and functionalisable particle foam particles,
d) shaping the functionalisable particle foam particles,
e) heating the shaped, functionalisable particle foam particles to a temperature below the melting range of the particle foam particles and thereby functionalising the shaped, functionalisable particle foam particles, wherein the particle foam particles are bonded together, and
f) cooling and thereby obtaining the shaped particle foam particles,
characterised in that the aqueous emulsion of the at least one polyolefin is an aqueous emulsion comprising at least one polyolefin converted to the liquid state with an anhydride of an unsaturated carboxylic acid and modified with methacrylic acid ester copolymers.

In a second aspect of the present invention, the above problem is solved by a particle foam moulding obtainable by the process according to the invention.

Translated with www.DeepL.com/Translator (free version)

The present invention has the general advantage over the prior art in that the particle foam particles can be processed at moderate process conditions to form mouldings which are free of chlorine and its products such as chloroform.

The invention is described in detail below. Whenever subject features are mentioned in the description of the process according to the invention, they refer in particular to the particle foam moulding according to the invention. Similarly, process features mentioned in the description of the particle foam moulding according to the invention relate to the process according to the invention.

The first aspect of the present invention relates to a process for producing mouldings from particle foams.

In step a), particle foam particles are provided for the particle foam moulding to be produced.

According to the invention, "particle foam" refers to thermoplastics which have already been processed by the manufacturer by foaming to form individual particles. These particle foams have the form of foam beads or foam pellets. In their raw state, they form free-flowing materials. The particle foams have densities in the range of 15 kg/m3 to 300 kg/m3, some special foams also have densities above 300 kg/m3, and are characterised by very good specific mechanical properties, high thermal insulation capacity and enormous lightweight construction potential.

The particle foam particles used in the present invention are essentially finished intermediate products, for example commercially available materials. Examples of commercially available materials are for EPP (expanded polypropylene) Neopolen® P of BASF SE and Eperan®-PP of Kaneka, for EPS (expanded polystyrene) Styropor®, Neopor® and Peripor® of BASF SE, for EPE (expanded polyethylene) Eperan®-EP of Kaneka or for EPET (expanded polyethylene terephthalate) ArmaShape® of armacell. In addition, further particle foams made of EPC (expanded polycarbonate), ETPU (expanded thermoplastic polyurethane), EPMI (expanded polymethacrylimide) or EPBT (expanded polybutylene terephthalate) are available. All of these and other particle foam materials can be used in the present invention.

Translated with www.DeepL.com/Translator (free version)

According to the invention, "particle foam" can also be renewable raw materials which are foamed into individual particles by thermal treatment. For this purpose, a process analogous to the production of popcorn ("puffed corn") is used. Water is bound in the starchy tissue of the renewable raw materials used. When these raw materials are heated rapidly, the water changes its aggregate state very quickly from liquid to gaseous, so that the starch liquefied by the heat and pressure expands rapidly in the foamy structure of the fabric and then immediately cools and solidifies.

The wetting in step b) is preferably carried out by spraying, in particular metered spraying, of the particulate foam particles in a closed container or in a partially open container. The aqueous emulsion of at least one polyolefin converted to the liquid state with an anhydride of an unsaturated carboxylic acid and modified with methacrylic ester copolymers used according to the invention is hereinafter referred to as "aqueous AMP emulsion" for ease of reading.

According to the invention, the polyolefin, which is present as a solid at room temperature under normal conditions, is converted to the liquid state of the aqueous AMP emulsion by the anhydride of an unsaturated carboxylic acid, so that it can be easily applied to the particle foam particles.

The aqueous AMP emulsion developed by the present inventors in the present invention is currently being prepared for commercial distribution as a finished activator, for which a safety data sheet has already been prepared. The offer and commercial distribution of the finished activator will not commence until after the publication of the present application for reasons of protection of novelty under patent law.

The anhydride of an unsaturated carboxylic acid is in particular preferably maleic anhydride. Furthermore, the term "polyolefin" more correctly denotes a "polyalkene" according to the Geneva Nomenclature. Preferably, the modified polyolefin in the aqueous AMP emulsion may be selected to be materially suitable or at least materially related to the particulate foam material. For example, the modified polyolefin in EPP as a particle foam material is in particular polypropylene (PP). In addition to polypropylene, polyethylene (PE) has proven to be very suitable as a polyolefin for modification.

Alternatively, the particle foam particles may be mixed for wetting in step b) in a closed container in which the particle foam particles are agitated in the aqueous AMP emulsion. Another variation according to the invention is that the particle foam particles and the aqueous AMP emulsion are pumped together between separate containers. In another variation of the invention, the particle foam particles may be placed in a container with a sieve bottom and flooded with the aqueous AMP emulsion without pressure.

In any case, the aim of wetting in step b) is, on the one hand, to completely wet the particle foam particles and, on the other hand, to collect and reuse the unneeded aqueous AMP emulsion.

After wetting in step b) and drying in step c), the particle foam particles are coated by a very thin solid layer of the aqueous AMP emulsion. Despite this solid layer, the particle foam particles remain optically unchanged, but can be functionalised on their surface.

Drying has a positive effect on the physical properties of the functionalisable particle foam particles in particular. Thus, drying can lead to the fact that the functionalisable particle foam particles can be promptly packaged (e.g. bagged) and made up in order to ship them as an intermediate product.

For the purposes of the present invention, "functionalisable" is understood to mean that the thin solid layer of the aqueous AMP emulsion on the particle foam particles behaves inertly under ambient conditions (normal pressure of approx. 1 bar, standard temperature of approx. 25° C.), i.e. does not significantly change the physical properties (e.g. the flowability) of the particle foam particles. Only at elevated temperature, as specified in more detail below, is the thin solid layer of aqueous AMP emulsion functionalised in the manner described below.

The functionalisable particle foam particles pre-treated in this way can be stored almost indefinitely before shaping in step d).

For shaping in step d), the functionalisable particle foam particles can be placed in a simple, suitable mould and, if necessary, compacted. Despite the functionalisability of the particle foam particles according to the invention, their pourability is maintained, so that filling a mould is possible without any problems.

Since the particle foam particles, depending on their actual material, have a melting range between 100° C. and 220° C., in step e) the heating of the moulded, functionalisable particle foam particles is carried out at a temperature below this melting range, which depends on the actual material, whereby the moulded, functionalisable particle foam particles are functionalised.

When the required temperature is reached, the previously non-polar surfaces of the particle foam particles are polarised by depositing heteroatoms on them from the functionalising layer (solid layer from the aqueous AMP emulsion).

However, according to the invention, the adhesion of the particle foam particles to each other is no longer brought about by substituting hydrogen with chlorine, as is explicitly described in patent EP 2 937 379 B1 granted to the present inventors. Rather, the required adhesion of the particle foam particles to each other is achieved by means of an adhesion caused by the aqueous AMP emulsion.

Specifically, the aqueous AMP emulsion according to the invention coats the particle foam particles as such and forms an extremely thin, mechanically adhesive film after drying. The anhydride of this unsaturated carboxylic acid, which hydrolyses in water to form the carboxylic acid, readily undergoes addition reactions due to its unsaturated compounds. As a result, this leads to electrochemical interactions and bonding between the surfaces of the particle foam particles and thus to a stable and permanent bonding of the individual particle foam particles to form a ready-to-use particle foam moulding.

The heating in step e) may be carried out in a number of ways. Traditionally, it can be done in an oven or a corresponding heating device. However, heating between two heating plates is also possible, without the need for a completely closed mould. This variant can be used if, for example, continuous production of profiles, semi-finished products or the manufacture of very long moulded parts is required. This is only feasible to a very limited extent, if at all, with the processes known today. In further embodiments, radiation-based energy sources (laser, infrared) can be used for heating.

The cooling in step f) can quite simply take place after the particle foam moulding has been demoulded at ambient temperature. However, the mould as such may also be cooled before the particle foam moulding is removed.

Compared to the prior art, the process according to the invention first has the advantage that the particle foam particles are bonded (but not sintered or welded) together at moderate process conditions, i.e. at a low pressure of 1 bar to 5 bar, preferably at 2 bar to 3 bar, and at temperatures below the melting range of the particle foam particles.

A significant advantage is that the activating aqueous AMP emulsion does not contain chlorine or chlorine compounds. First of all, this is a significant advance with regard to environmental aspects and health hazards. In addition, chlorine is problematic when particle foam mouldings that are no longer used are recycled at a later date. In addition, chlorine-containing activators, such as the aqueous emulsion of at least one polyolefin modified with chlorine and maleic anhydride ("aqueous CMP emulsion") previously used by the present inventors, always contain an, albeit small, amount of chloroform (in the range of <0.5%). Even such a small amount, however, must be mentioned in a safety data sheet, which significantly reduces the acceptance of such an activator. The present inventors are not aware of any manufacturer or supplier of chlorinated polyolefins where these chlorinated polyolefins do not also contain a certain amount of chloroform.

The particle foam mouldings produced with the aqueous AMP emulsion according to the invention are qualitatively equivalent to those parts described by the present inventors in EP 2 937 379 B1.

Finally, the use of the aqueous AMP emulsion according to the invention leads to a significant extension of the application possibilities of the process according to the invention compared to the processes known from the prior art, which will be further explained below.

It is particularly preferred if the aqueous emulsion is a chlorine-free aqueous emulsion of at least one polyolefin converted to the liquid state with maleic anhydride and modified with an acrylate resin.

In a very specific embodiment, the aqueous AMP emulsion used is a polypropylene modified with the chlorine-free emulsion of an acrylate resin and maleic anhydride.

In order to improve and increase the adhesion of the functionalising layer to the particle foam particles, in a further embodiment of the process according to the invention, at least one epoxy-terminated silane, for example based on an epoxycyclohexyl, is added to the aqueous emulsion of the at least one polyolefin converted to the liquid state with an anhydride of an unsaturated carboxylic acid and modified with methacrylic ester copolymers.

The epoxy-terminated silane leads to improved adhesion of the functionalising layer to the particle foam particles after previous hydrolysis in the aqueous AMP emulsion and subsequent condensation through the formation of carboxylated polymers, whereby furthermore a high-boiling ester alcohol can serve as coalescing agent.

Preferably, the addition of the at least one epoxy-terminated silane to the aqueous emulsion of the at least one polyolefin converted to the liquid state with an anhydride of an unsaturated carboxylic acid and modified with methacrylic ester copolymers (aqueous AMP emulsion) occurs immediately prior to step b). The epoxy terminated silane may be added to the aqueous AMP emulsion by simple stirring.

According to an alternative further development of the invention, at least one epoxy resin may be added to the aqueous emulsion of the at least one polyolefin converted to the liquid state with an anhydride of an unsaturated carboxylic acid and modified with methacrylic ester copolymers (aqueous AMP emulsion).

The epoxy resin is in particular a difunctional bisphenol A/epichlorohydrin derivative, which is preferably undiluted and/or liquid and/or colourless and/or clear. On the one hand, the epoxy resin stabilises the emulsion. On the other hand, since it is not crosslinked with amines or isocyanates—as is customary, for example, in the case of lacquers, casting resins and the like—the epoxy resin acts as an elasticising component in the functionalising layer.

A preferred embodiment of the present invention provides that the particle foam particles provided in step a) comprise two or more different particle foam materials. Particle foam materials are used herein to refer in particular to different plastics such as EPP, EPE, EPC, EPS, EPET, ETPU, EPMI or EPBT and the like. The use of the aqueous AMP emulsion according to the invention opens up a wide range of possible particle foam mouldings in this way, since different materials—and thus their specific properties—can be combined with each other in a simple manner.

Likewise, in another further embodiment of the invention, the particle foam particles provided in step a) may be a mixture of at least two different types of the respective particle foam material, which makes it possible, for example, to produce porous or partially porous density distributions as well as gradients.

By using the aqueous AMP emulsion according to the invention, it is possible, as described above, to expand the possible applications, which in a preferred embodiment of the present invention means that the method further comprises, prior to step d), the step d0) of providing a foreign material that forms a composite moulding with the particle foam particles, wherein in step d) the moulding of the functionalisable particle foam particles is carried out in direct contact with the foreign material.

For the purposes of the present invention, "extraneous material" is understood to mean first of all materials which have no chemical and/or physical relationship to the particle foam materials, such as textiles, metals, high-density plastics, natural materials (wood, etc.). Another type of foreign materials are functional components, for example electrical connection cables or sensors for the detection of mechanical or physical conditions (e.g. pressure, temperature, humidity, etc.).

These foreign materials can be used to provide the particle foam mouldings to be produced with a lamination, a mechanical reinforcement, a physical seal or an optical finish. Similarly, the particle foam mouldings to be produced may be provided with a functional component. In the embodiments described in more detail below, some combinations of particle foam materials and foreign materials are exemplified.

The providing in step d0) may in particular be performed by at least partially equipping or lining a mould for the particle foam moulded part to be produced with a foreign material before filling the mould with the particle foam particles. Similarly, a reinforcing material may first be provided in the mould before particle foam particles are filled around this reinforcing material.

Furthermore, the provision in step d0) can also be carried out alternately, for example by first placing a foreign material (e.g. a film), then a first pour of the functionalisable particle foam particles, on which a further foreign material (e.g. in the form of a reinforcing rib) is placed, before a final pour of functionalisable particle foam particles. Likewise, another foreign material can be placed on top of the final fill before shaping takes place in step d).

The phrase "in direct contact" means that the particle foam particles are filled onto, into or around the foreign material without further pre-treatment of the foreign material, so that the particle foam particles come into direct contact with the surface of the foreign material.

Surprisingly, it was found that with the method according to the present invention, according to this further development, it is possible to produce durable bonds from a wide variety of particle foam materials to a wide variety of foreign materials, so as to provide the obtained particle foam mouldings in combination with one or more foreign materials. In particular, this is possible without subjecting the foreign materials to a special pre-treatment, for example with adhesion promoters or the like.

In this context, the term "lamination" is understood to mean the joining of several layers of the same or different materials, in particular in order to protect and/or decorate the particle foam mouldings obtained and/or to achieve an addition of favourable material properties. The term "reinforcement" is familiar to the skilled person. Reinforcements serve in particular to improve the mechanical properties of a moulded part.

Usually, laminations or similar foreign materials are realised in a second operation separate from the manufacturing process of the moulded part, by first applying a laminating agent (e.g. lacquer, glue, wax) to the finished moulded part before the actual lamination is applied. According to the invention, a particle foam moulded part can now be produced with foreign material in a single operation. A major advantage is the wide range of possible foreign materials in combination with the particle foam materials, which can be used essentially without pre-treatment in the process according to the invention.

A further embodiment provides that an already finished particle foam moulding is also joined to another particle foam moulding or provided with a foreign material. For this purpose, analogously to step b), the aqueous emulsion of the at least one polyolefin converted into the liquid state with an anhydride of an unsaturated carboxylic acid and modified with methacrylic ester copolymers is applied to the relevant surfaces of the parts to be joined, these are dried according to step c) and then joined analogously to step d), before the composite to be produced is heated for joining according to the process of the invention.

With this embodiment, it is also possible to subsequently further process or handle already finished particle foam mouldings. For this purpose, these finished particle foam mouldings do not necessarily have to have been produced by the method according to the invention; they can also be commercially available mouldings which are difficult or costly to produce according to the prior art. This embodiment further enables the production of more complicated particle foam mouldings, which can be assembled from geometrically simple particle foam elements according to the invention.

In a further embodiment of the process according to the invention, the moulding in step d) is carried out at least temporarily under mechanical pressure, which has been shown to be advantageous for the stability of the particle foam moulding to be produced.

The pressure to be applied at least temporarily can be between 1 bar and 5 bar, in particular between 2 bar and 3 bar, depending on the intended application of the particle foam moulding. In particular, the density of the finished particle foam moulding can be adjusted over a wide range via the pressure applied in step d). This also makes it possible to set density gradients, since the individual particles do not have to be completely bonded to each other. The porous structure formed in this way offers additional areas of application.

The subsequent result, i.e. the properties and quality of the manufactured particle foam moulded part, depends to a large extent on the pressure to be applied. However, this dependence on pressure does not mean that a good result can only be achieved with a sufficiently high pressure. Rather, the pressure when filling the mould in step d) reflects the variability of the process according to the invention.

In an alternative embodiment, the mechanical pressure in step d) is applied only intermittently. This means that pressure is applied only for shaping, or compacting, the fill of particle foam particles, for example with a plunger, which is then released again. According to the invention, a degree of compaction between 1.5 and 2 is preferred.

In another preferred further development of the process according to the invention, the heating in step e) is carried out without pressure. "Unpressurised" in this context means that no (additional) pressure is applied from the outside during heating, as is common in the prior art. Since according to the present invention preferably no pressure-stable moulds need to be used, also essentially no high pressure can build up during heating. "Pressureless" in the sense of the invention further means that the pressure applied in step d) for shaping the functionalisable particle foam particles can still be maintained at least at the beginning of the heating in step e).

In classical sintering according to the state of the art, particle foam particles are first compressed when filling the still cold mould (filling injector). However, this pressure is not yet sufficient for the subsequent sintering process. Only when heated with water vapour does the air enclosed in the particle foam particles expand and cause the pressure to rise further. Only then does sintering take place. In contrast, in the process according to the invention, the pressure does not increase further after filling the mould and moulding in step d), but decreases in the subsequent process steps.

In a further development of the invention, after the moulding in step d), the applied pressure can be completely released and the process according to the invention can also be carried out. In this case, a particle foam moulding with a very loose and open structure is obtained from a relatively loose bulk of the particle foam particles. Such special particle foam mouldings are desirable for use as vents or drains. Furthermore, these special particle foam mouldings can be used in sandwich structures where the main concern is to distance the load-bearing surfaces from each other.

Since the different particle foam materials have different melting ranges between 100° C. and 250° C., it has proved advantageous according to the invention to carry out the heating in step e) at a temperature of 80° C. to 220° C., in particular at 110° C. to 160° C. In this way, the heating can be carried out "dry", i.e. without a possibly disturbing liquid phase. Moreover, at these temperatures it is ensured that functional components (in particular sensors) are not destroyed and remain functional even after the shaping process according to the invention.

A particular embodiment of the present invention provides for the process that, in a modified step d), the moulding is carried out in individual layers and/or structures of functionalisable particle foam particles. In other words, desired geometries can first be specified with the functionalisable particle foam particles.

In the subsequent modified step e), heating is performed with a locally focusable energy source so that the functionalisable particle foam particles in the individual layers or structures are bonded together. This energy source may be, for example, a laser or an infrared source. The focusable energy source may heat individual areas of the functionalisable particle foam particles in rows, grids or punctually, and bond them together only there using the method according to the invention.

In a modified step f), cooling is carried out by deactivating the locally focusable energy source so that a partial particle foam moulding is initially obtained. This partial particle foam moulding substantially replicates the geometry specified in modified step d).

Subsequently to the modified step f), in a step g) at least one further layer and/or one further structure of functionalisable particle foam particles is provided in contact with the partial particle foam moulding. In this way, the geometries generated above can be further built up.

To obtain the final desired geometry, the modified steps d), e) and f) and step g) are repeated until the final particle foam moulding is obtained.

This particular embodiment provides a form of 3D printing using the means of the present invention. Thereby, according to the invention, it is also possible to produce more complex geometries with cavities, undercuts or the like from particle foam particles. The insertion of foreign materials and their connection with the particle foam particles or a partial particle foam moulded part are also possible.

In a second aspect, the objective of the present invention is achieved by a particle foam moulding obtainable by the method according to the invention.

Such a particle foam moulding has the advantage that it is easier and less expensive to produce than comparable mouldings in the prior art. In addition, it does not contain any residues of chlorine or chlorine compounds such as chloroform, since the aqueous AMP emulsion according to the invention, which is chlorine-free, is used for production.

Small series and even individual parts can be produced with reasonable effort. Likewise, composites can be produced in a single process step ("in mould"). The particle foam moulded parts according to the invention can also have a porous or partially porous density distribution in order to obtain tailor-made properties.

In the case of the particle foam mouldings according to the invention, the moulding densities to be achieved can be varied to a greater extent by the process according to the invention. In this way, not only mouldings of different densities can be produced, but also partially porous structures, since even small contact areas between the individual particle foam particles lead to a bond and enable the formation of a moulding.

A further, third aspect of the present invention is the use of a chlorine-free aqueous emulsion of at least one polyolefin comprising at least one polyolefin converted to the liquid state with an anhydride of an unsaturated carboxylic acid and modified with methacrylic acid ester copolymers for the production of particle foam mouldings, wherein the particle foam is selected from thermoplastics.

In the prior invention of the present inventors, all embodiments were based on an emulsion comprising chlorine. Practically, no moulded parts were possible with this earlier invention without the presence of chlorine. Moreover, the presence of chlorine required the use of elaborate safeguards. In practice, it was found that a residue of chlorine in the form of trichloromethane ("chloroform") always remained in the mouldings, which posed problems both for recycling and for the disposal of used parts. The process according to the earlier invention of the present inventors met with a lack of acceptance by the users for this reason. Also, the results obtained in the so-called fog test (health-relevant vapours when heating the moulded parts) required by the automotive industry showed only completely unsatisfactory values. This required a completely new development, which led to the present invention.

The use of this aspect according to the invention now enables the production of particle foam mouldings without any remaining chlorine content. In addition, the AMP emulsion used has the advantage over the emulsion used in the prior invention of the present inventors of not only functioning substantially with expanded polypropylene as the polyolefin, but being applicable to a wide range of polyolefins as listed above.

The fourth aspect of the present invention extends the use of a chlorine-free aqueous emulsion of at least one polyolefin comprising at least one polyolefin converted to the liquid state with an anhydride of an unsaturated carboxylic acid and modified with methacrylic ester copolymers to the manufacture of particle foam mouldings, wherein the particle foam is selected from natural renewable raw materials.

As used herein, "naturally renewable raw materials" refers to all natural substances that can be converted into particle foams or foam particles. This includes, among others, starch-containing natural substances that foam up by themselves under the influence of temperature. Also included are natural substances which can be foamed by external blowing agents.

It has been shown that the AMP emulsion according to the invention can also be used to combine particle foams made from renewable raw materials to form moulded parts. A simple example is a type of "popcorn" in which particle foams based on corn starch are processed into moulded parts.

As a special feature, the particle foams based on renewable raw materials are not treated with the AMP emulsion in a mixing station in the same way as particle foams based on plastics, since in this case, depending on the specific material, there is a possibility that these particle foams absorb too much water and thus swell up. It is therefore preferable to apply the AMP emulsion undiluted and by means of a spraying process to the particle foams made of renewable raw materials. After subsequent air drying, the particle foams made from renewable raw materials are then just as free-flowing as their plastic-based equivalents and can be processed into moulded parts using the same method as the latter.

This use and this process are particularly advantageous when plastic is to be replaced by renewable raw material for ecological reasons.

A further, fifth aspect of the present invention is the use of a chlorine-free aqueous emulsion of at least one polyolefin comprising at least one polyolefin converted to the liquid state with an anhydride of an unsaturated carboxylic acid and modified with methacrylic ester copolymers, for permanently bonding metallic surfaces.

Surprisingly, it has been shown that the AMP emulsion according to the invention is not only suitable for the production of moulded parts from particle foams on an artificial or natural basis, but also for the permanent bonding of metallic surfaces, i.e. for bonding metal objects together.

The metals that can be used are not limited, as long as the objects made therefrom have a smooth or flat surface for bonding to a similar opposite smooth or flat surface. In the context of the present invention, pairs of like metals can be joined together in the same way as pairs of dissimilar metals, without being subject to any particular limitations.

To join metal parts together, their contact surfaces are preferably dabbed or wiped with a thin layer of the AMP emulsion according to the invention. After complete drying, the treated parts are then joined together with the maximum possible contact area, annealed at an elevated temperature and held together in a stable manner until cooling. In practice, a time of one to 5 minutes, especially one to two minutes, and at a temperature of 100° C. to 140° C. has proven to be particularly suitable.

After such a process has been carried out, the metal parts are firmly and permanently bonded together. In first mechanical tests with different metals (steel, stainless steel, aluminium, brass) tensile strengths of 5.6 N/mm2 could be determined.

This embodiment is advantageous for applications in which welding processes are to be replaced or at least reduced, for example for reasons of occupational safety or energy saving.

In the above uses of a chlorine-free aqueous emulsion of at least one polyolefin according to any of the third, fourth or fifth aspects, the chlorine-free aqueous emulsion is in particular an aqueous emulsion of at least one polyolefin converted to the liquid state with maleic anhydride and modified with an acrylate resin.

BRIEF DESCRIPTION OF THE DRAWINGS

Further objectives, features, advantages and possible applications will be apparent from the following description of embodiments which do not restrict the invention, also with reference to the figures. In this context, all the features described and/or illustrated constitute the subject-matter of the invention, either individually or in any combination, even irrespective of their summary in the claims or their relation back. Showing:

DETAILED DESCRIPTION OF THE INVENTION

Figure 1:
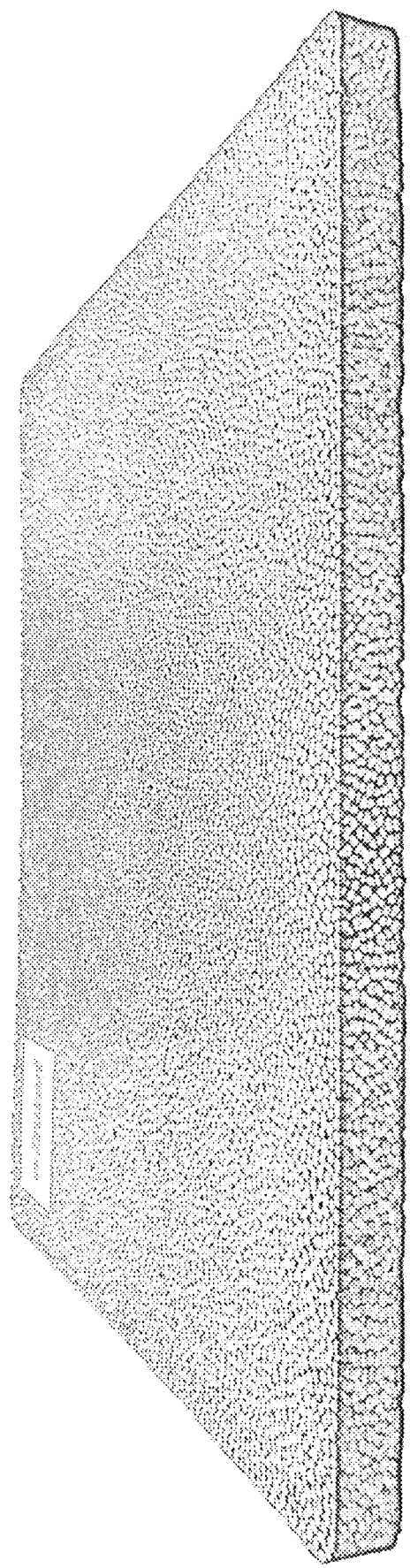
FIG. 1 a photographic image of a particle foam moulding made of EPP produced by the process according to the invention, FIG. 2 a photographic image of a particle foam moulding made of EPP produced by the process according to the invention with an applied textile fabric.
Figure 2:
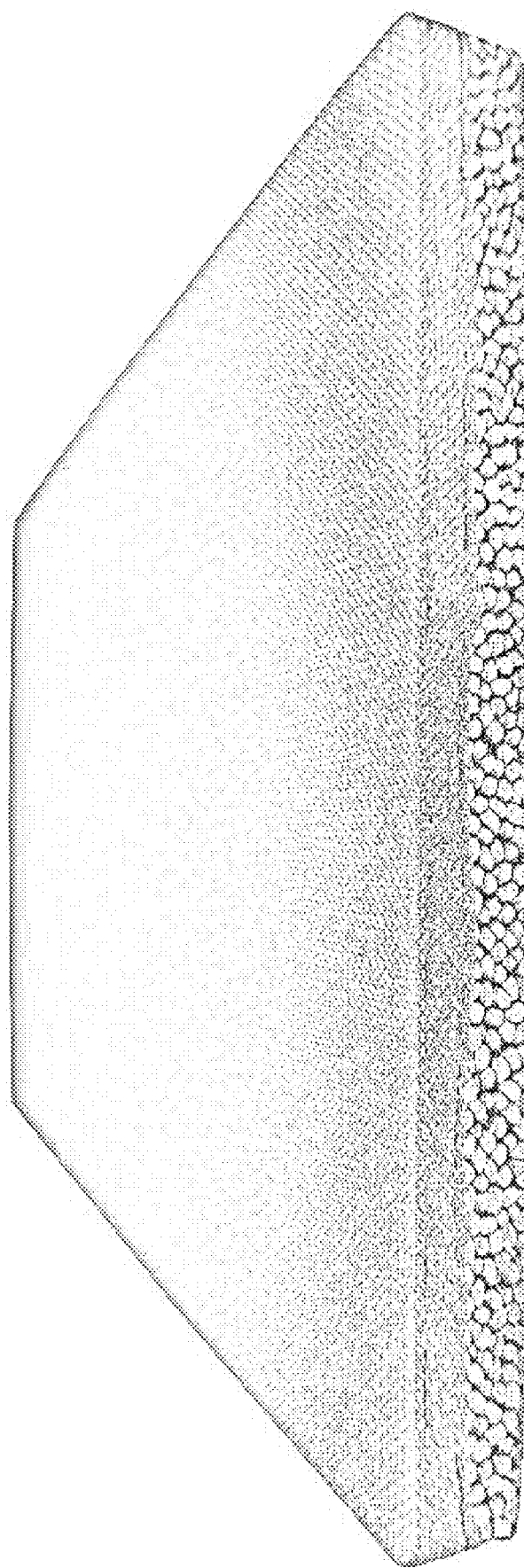
Figure 3:
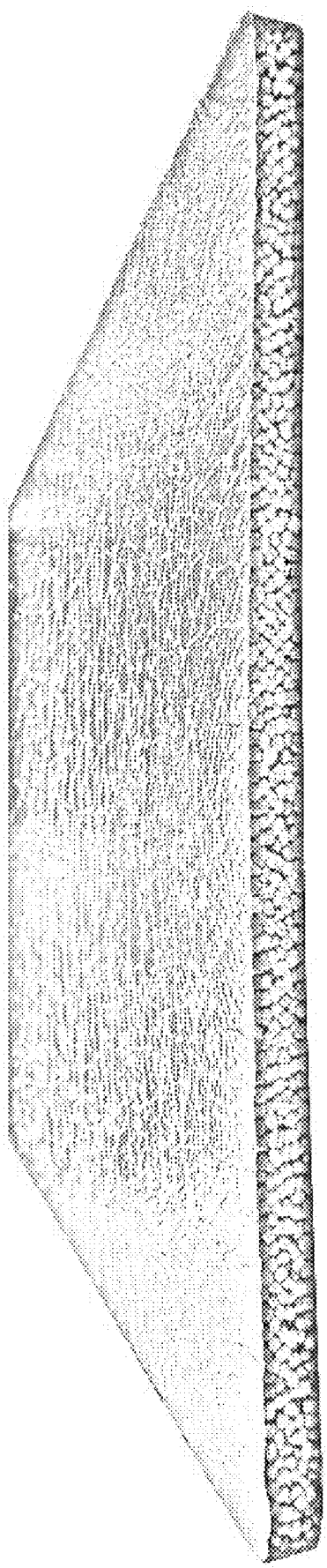
FIG. 3 is a photographic image of a particle foam moulding made of EPP by the method of the invention with an applied aluminium foil.
Figure 4:
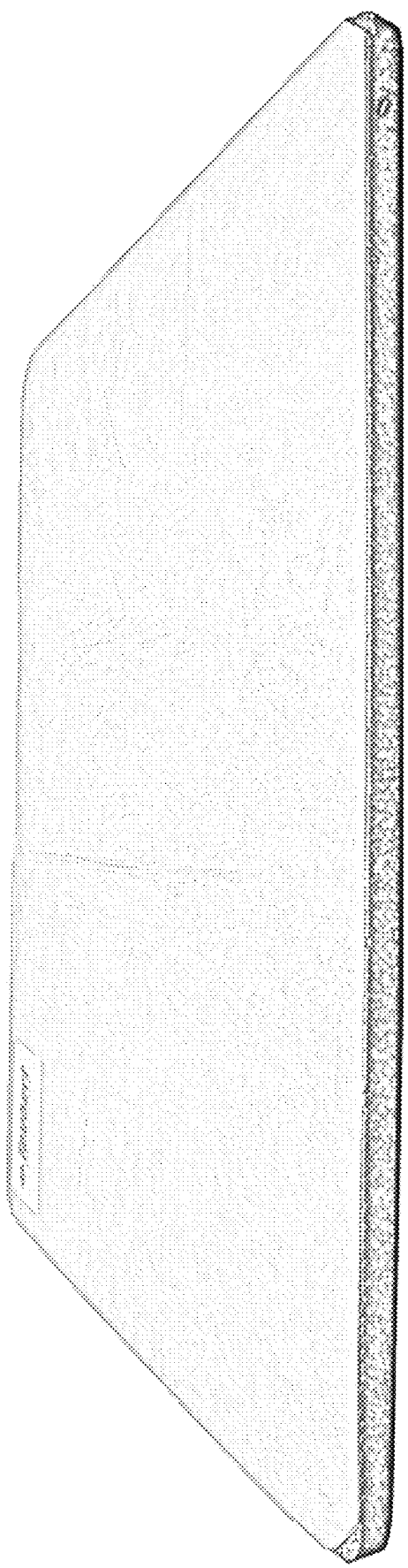
FIG. 4 is a photographic image of a particle foam moulded EPP part produced by the process according to the invention with an applied aluminium sheet, FIG. 5 a photographic image of a particle foam moulding made of EPP with an applied GRP sheet produced by the process according to the invention.
Figure 5:
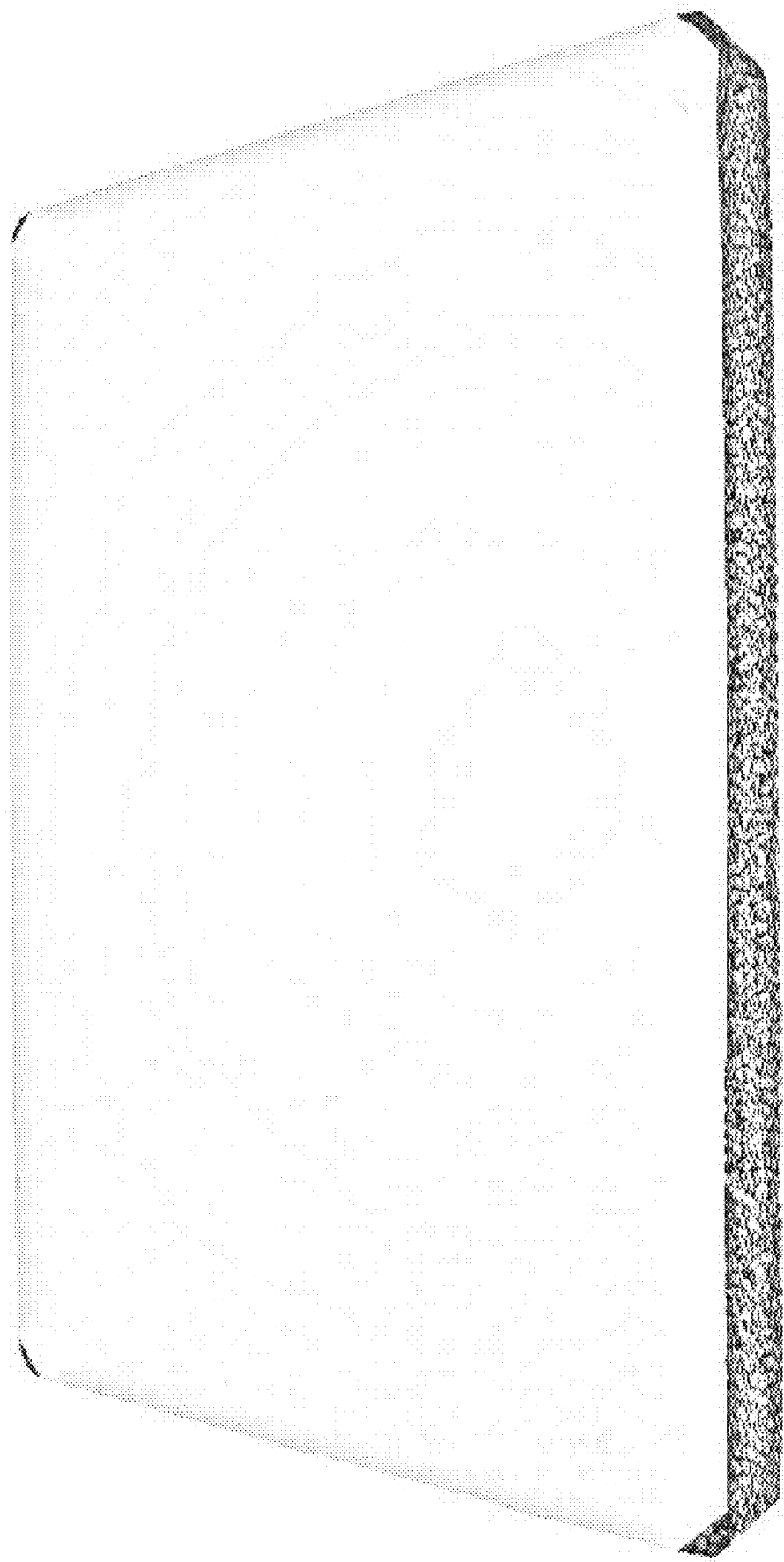
Figure 6:
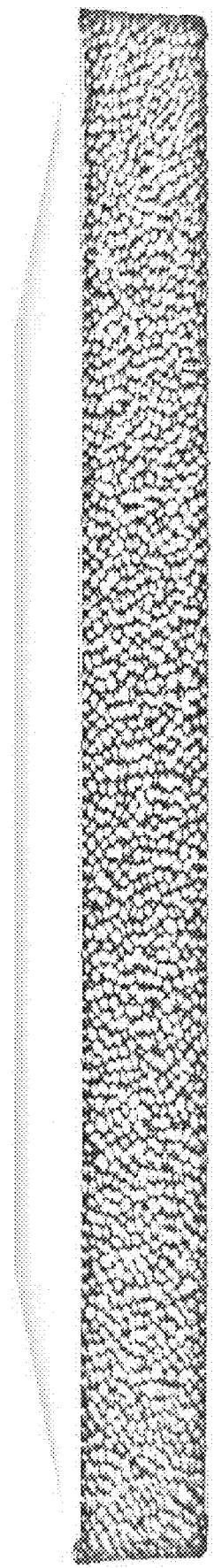
FIG. 6 is a photographic image of a particle foam moulding made of EPP using the process according to the invention, with a steel sheet applied.
Figure 7:
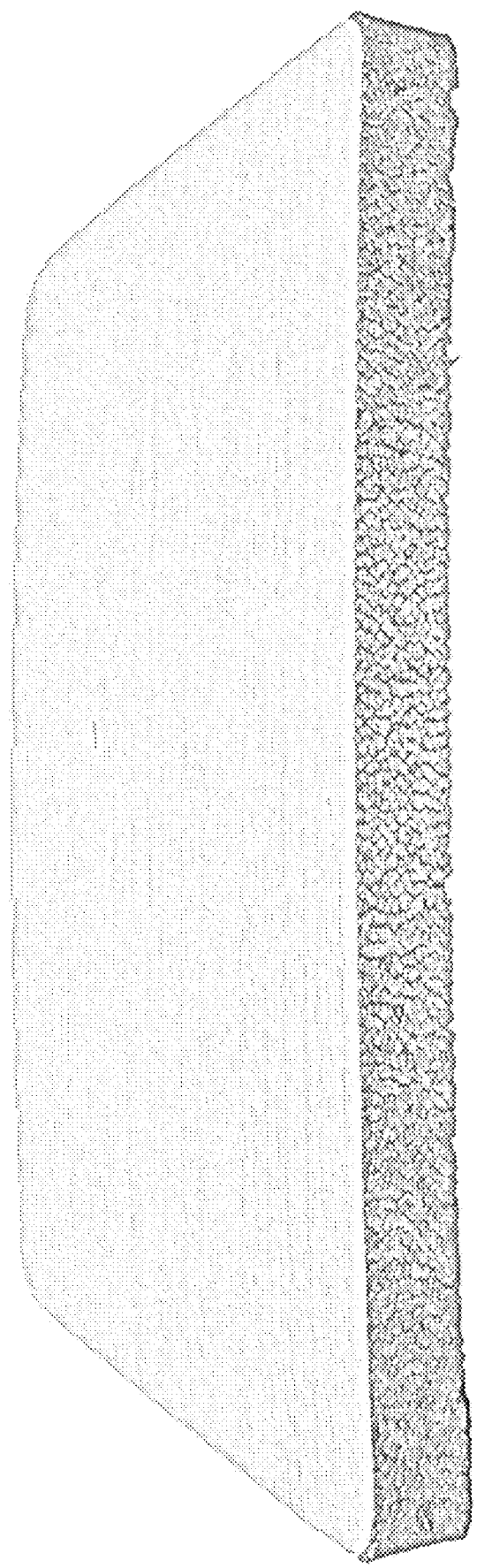
FIG. 7 is a photographic image of a particle foam moulding made of EPP using the process according to the invention with an applied wood decor.
Figure 8:
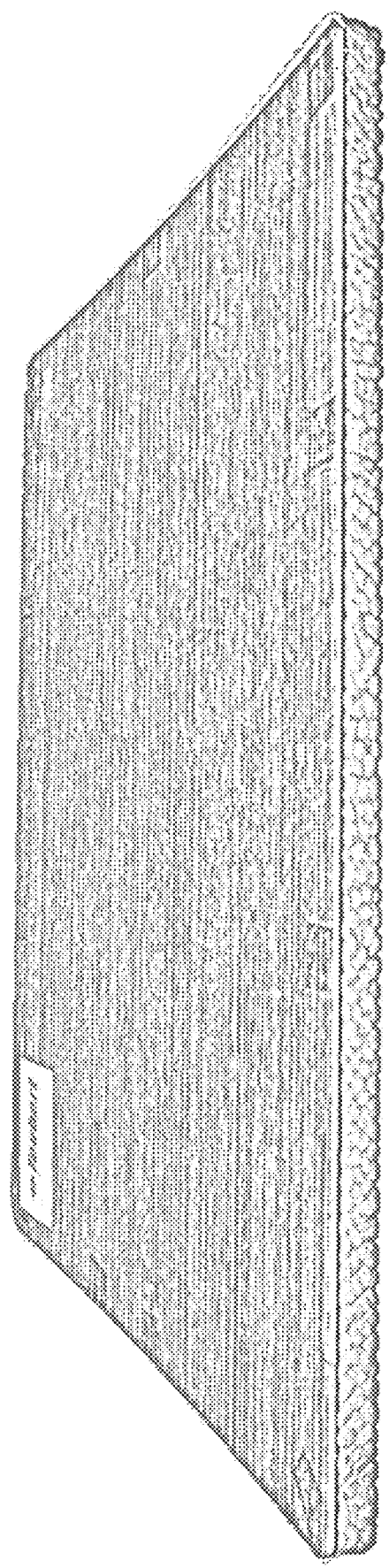
FIG. 8 is a photographic image of a particle foam moulding made of EPC with an applied wood decor, produced by the process according to the invention.
Figure 9:
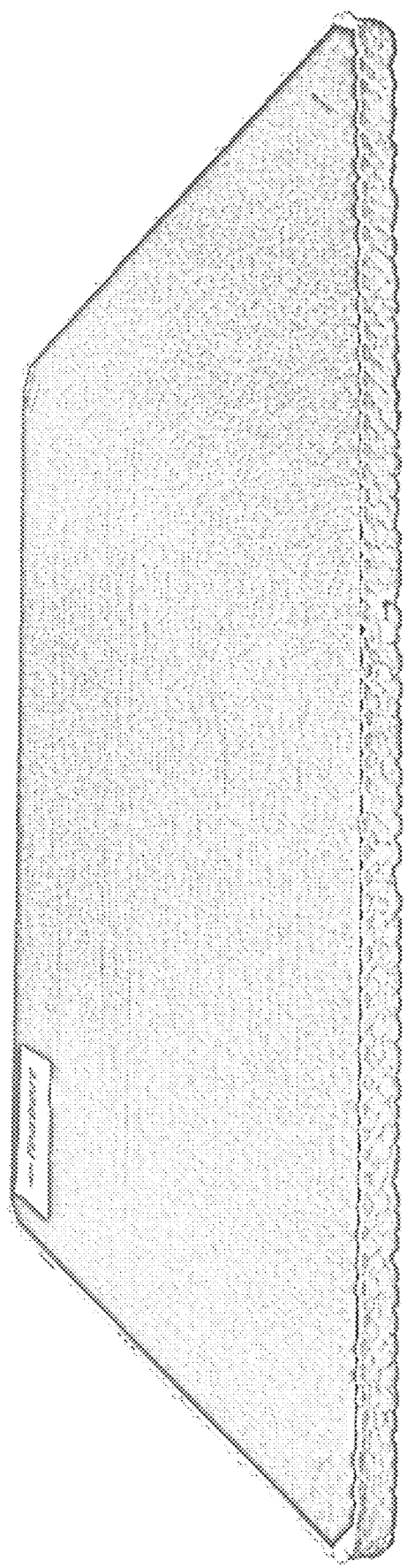
FIG. 9 is a photographic image of a particle foam moulding made of EPC produced by the process according to the invention with an applied organic sheet.
Figure 10:
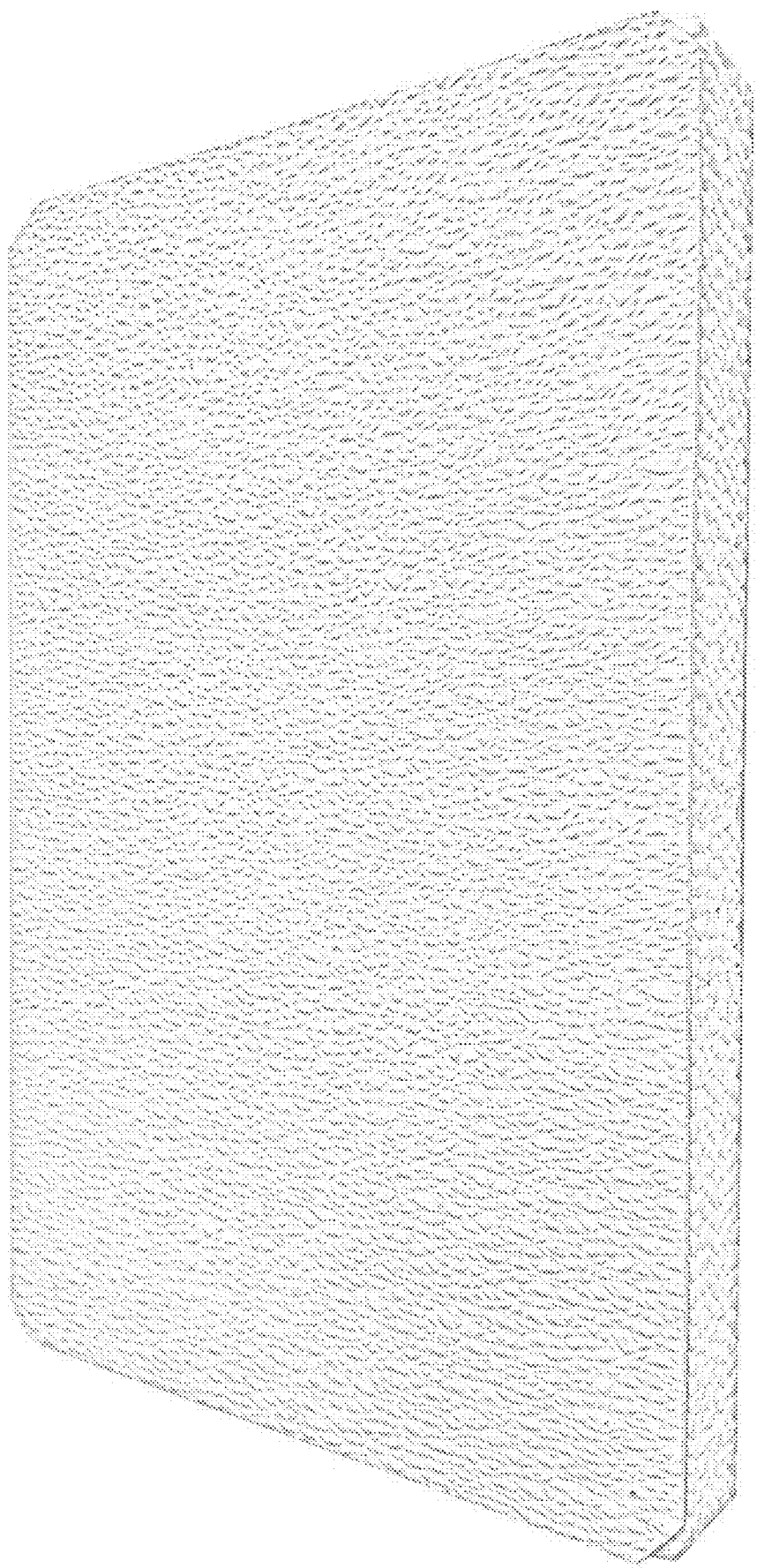
FIG. 10 is a photographic image of a particle foam moulding made of EPS with an applied GRP sheet produced by the process according to the invention.
Figure 11:
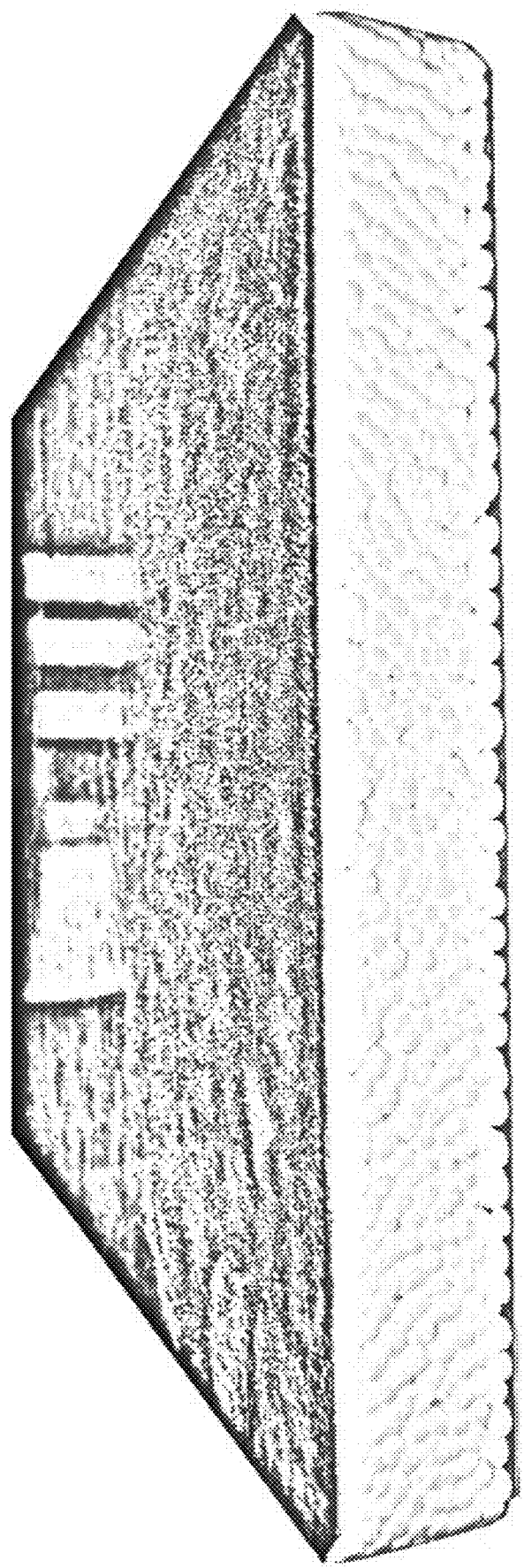
FIG. 11 is a photographic image of a particle foam moulding made from EPS using the process according to the invention, with a steel sheet applied.
Figure 12:
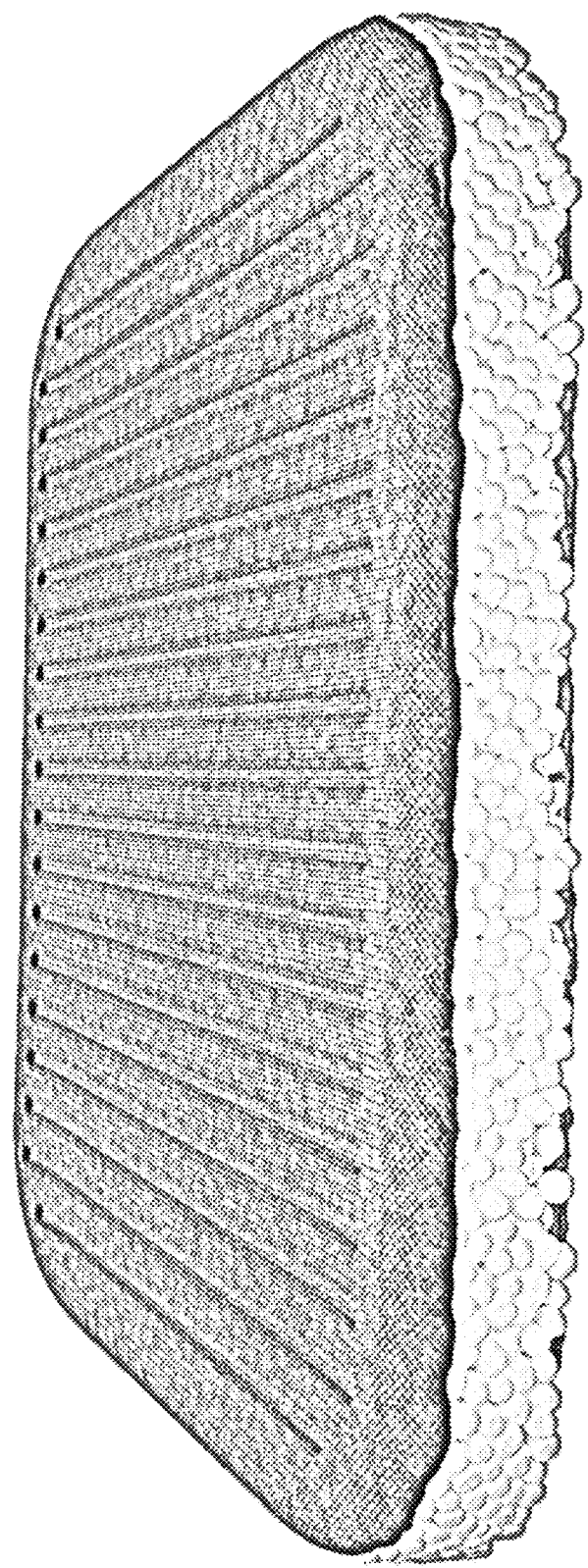
FIG. 12 is a photographic image of a particle foam moulding made of ETPU produced by the process according to the invention with an applied textile fabric.
Figure 13:
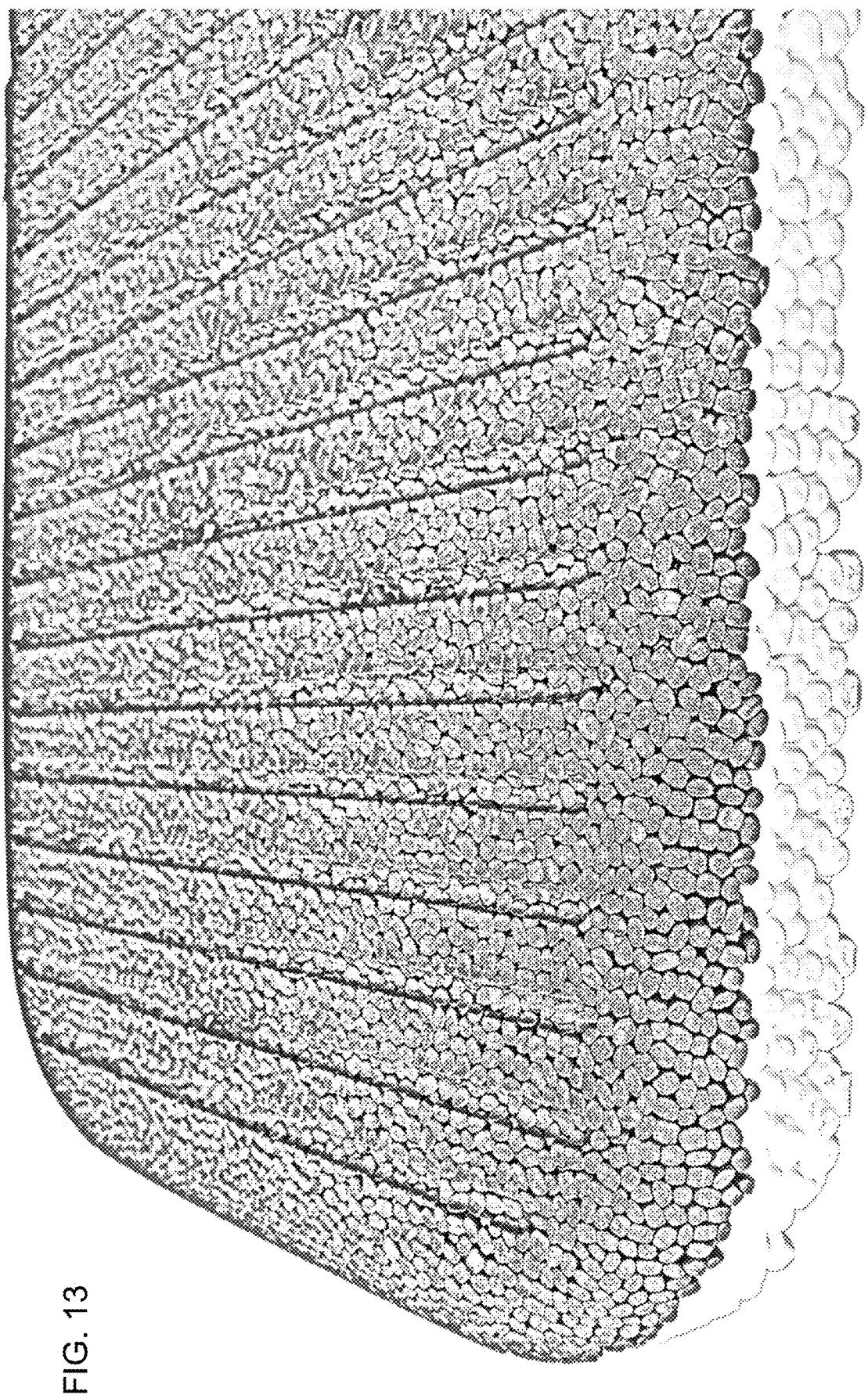
FIG. 13 is a photographic image of a particle foam moulding made of EPP and ETPU produced by the process according to the invention, FIG. 14 a schematic representation of the adhesion of the AMP emulsion to the surface of the particle foam particles, FIG. 15 a schematic representation of a fully automatic mixing device suitable according to the invention, FIG. 16 a photographic illustration of a semi-automatic mixing device, FIG. 17 a photographic image of a semi-automatic mixing device, FIG. 18 a photographic image of an opened mould, FIG. 19 a photographic image of the bonnet side of the mould, FIG. 20 a photographic image of a filling device, FIG. 21 a photographic image of a closed mould, FIG. 22 a photographic image of a mould opened after the process.

FIGS. 1 to 13 show, as explained above, the wide range of possible combinations of particle foam particles with foreign materials to form particle foam mouldings. These photographic illustrations are self-explanatory in themselves, but cannot be exhaustive of the possible combinations. For example, successful experiments have been carried out with EPE. All of the particle foam materials shown in FIGS. 1 to 13 can be combined with all of the foreign materials shown there. The particle foam mouldings shown in FIGS. 1 to 13 were each produced in a single operation, using a so-called in mould process.

Preferably, the foreign materials can be selected from films, textiles, sheets, solid bodies and combinations thereof. The films may be polymer films or metal films. The textiles may be natural fibres, polymeric fibres, metallic fibres and combinations thereof and may be woven fabrics, scrims, rovings, knitted fabrics, braided fabrics, knitted fabrics and combinations thereof. Sheets are understood to be bodies whose areal extent is a multiple of their thickness. The plates can also consist of natural materials, polymeric materials, metallic materials and combinations thereof. By solid bodies are meant bodies whose three dimensions are essentially of the same order of magnitude. These bodies may also include natural materials, polymeric materials, metallic materials and combinations thereof.

The abbreviations are used as follows: "EPP"=expanded polypropylene, "EPC"=expanded polycarbonate, "EPS"=expanded polystyrene, "ETPU"=expanded thermoplastic polyurethane, "EPE"=expanded polyethylene, "GRP"=glass fibre reinforced plastic. The term "organic sheet" is used to describe a fibre composite material in which fibres such as glass, aramid (aromatic polyamides) or carbon are added to a thermoplastic matrix.

The following is an example of the reaction mechanism of an emulsion containing nanoscale, interfacial materials for the production of particle foam mouldings without water vapour.

A finely divided aqueous emulsion of a maleic anhydride modified polyolefin is mixed with 1% to 2% (based on the polyolefin solid) of an epoxy terminated silane. This silane can be added to the aqueous AMP emulsion by simple stirring. However, in order to keep the mixture of AMP emulsion and silane stable during storage, the desired reactions should not already take place in the storage container, but only during the functionalisation of the particle foam particles.

To avoid premature hydrolysis of the silane in the water of the emulsion, it is particularly preferred to adjust the aqueous AMP emulsion to a pH of 8.3 to 8.4 by adding diethylethanolamine. During the film formation following the application, the pH increases to 8.8 to 9.2 and the following reactions occur:
  i) Hydrolysis of the epoxy-terminated silane in the water of the aqueous AMP emulsion.

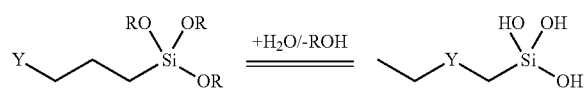

(where the substituents Y and R may be of different types).
  ii) Condensation

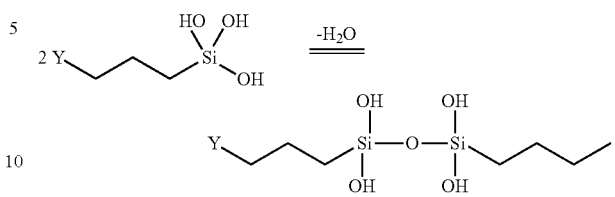

This condensation leads to the adhesion of the aqueous AMP emulsion to the particle foam particles and to their cross-linking.

The following reactions with the epoxysilane occur in the aqueous AMP emulsion:
  iii) Attachment of the silane to the acrylic acid ester group shown below and subsequent hydrolysis.

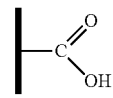

(iv) cross-linking (chemical and physical resilience)

Figure 14:
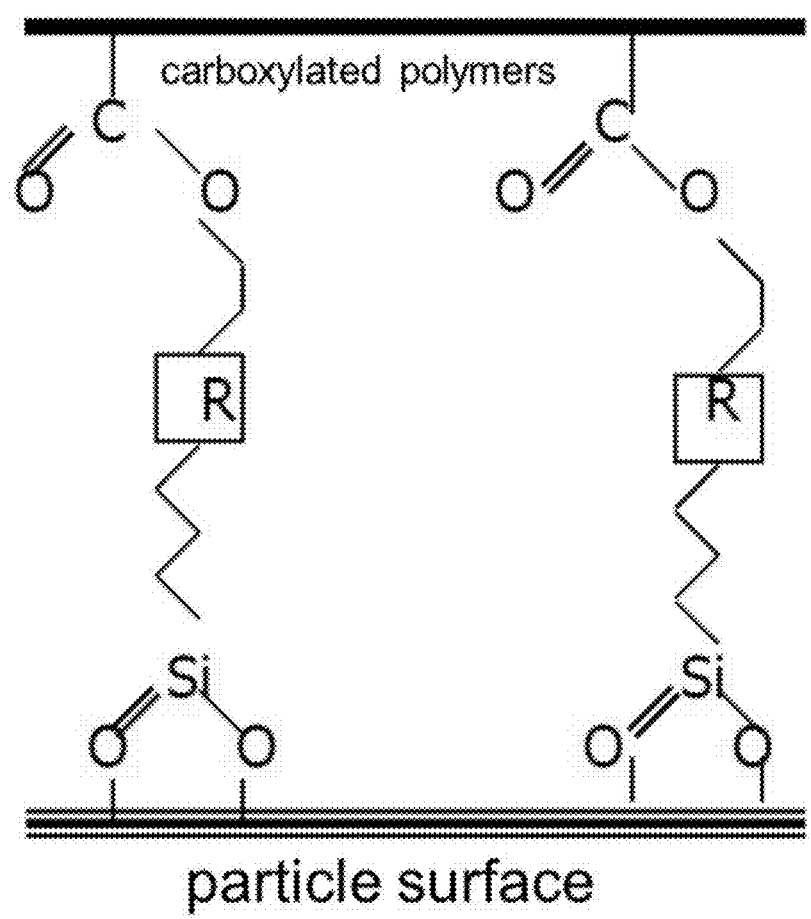

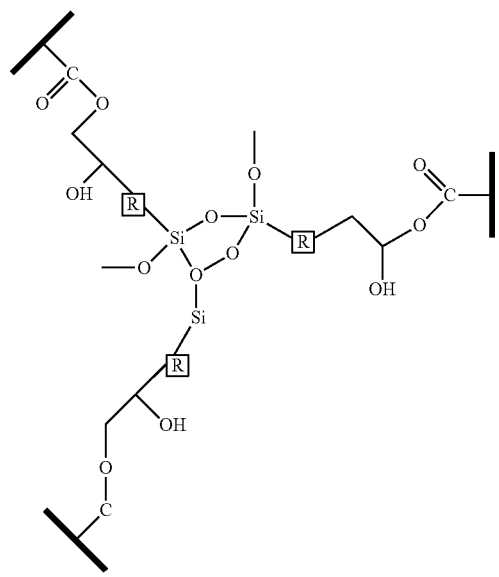

v) Adhesion of the aqueous AMP emulsion to the surface of the particle foam particles, a schematic representation of the adhesion is shown in FIG. 14.

In the following, the process for the production of particle foam mouldings according to the invention is illustrated by means of a concrete process description.

Step 1: Preparation of the Particles

Commercially available particle foams are used. Particle foam based on PP, e.g. under the brand name ARPRO from the company JSP, Neopolen P from the company BASF or Eperan P from the company Kaneka can be mentioned as examples. Particle foam based on PS is known under the name Styropor from BASF, among others. Other processable particle foams are e.g. Piocelan from Sekisui, Infinergy from BASF, ArmaShape from Armacell, to name just a small selection.

The particle foam particles are mixed with a small amount of the activator (i.e. the aqueous AMP emulsion according to the invention) in a suitable plant/device/vessel. Care should be taken to ensure that the particle foam particles form as uniform a film on the surface as possible. Overdosing does not harm the production process, but may prolong it, which is uneconomical. After uniform mixing, the now functionalisable particle foam particles are dried again in the mixing device until they are free-flowing. The activator is now firmly bonded to the surface of the functionalisable particle foam particles.

Step 2: Intermediate Storage or Drying of the Particle Foam Particles

It is recommended to store the functionalisable particle foam particles for a short time before further processing. If the particle foam particles are prepared for later processing, it does not harm the process if the activator is completely dried. A maximum storage time has not yet been determined at the current stage of development.

Step 3: Preparation of Mould and Machine

For economical production, it is advisable to make an indirectly heated mould. The general basic design is very similar to an injection mould. It is important that the intended mould can reproduce fast and absolutely dry cycles over a wide temperature range, whereby the temperature window can lie between 60° C. and 220° C., depending on the particle foam used. The use of external temperature control units, such as those used in conventional injection moulding, has proven to be very effective. Variothermic controls can also be used to advantage.

The moulding tool intended for use must be provided with a suitable non-stick seal, e.g. with PTFE (polytetrafluoroethylene/Teflon®), so that a non-detachable connection between particle foam and tool surface is avoided. The mould is mounted on an appropriately modified particle foam press. The modifications mainly refer to the integration of the temperature control unit as well as the adaptation of the process software to the steam- and water-free process.

Step 4: Filling the Mould

After the two mould halves have been closed, the functionalisable particle foam particles are now filled into the mould by means of a standard filling device for particle foam, via pressure hoses and filling injectors. The filling device allows compression of the functionalisable particle foam particles in the mould (pneumatically, mechanically or in combination), whereby the compression rate can be up to 50% of the original bulk density. The compression in the mould has a significant influence on the subsequent moulded part density.

For the production of moulded parts with a connection on one or both sides with special cover layers or laminations (sandwich components), the materials to be connected (i.e. foreign materials) are fixed in the mould before the functionalisable particle foam particles are filled in. It must be ensured that the positions of the filling injectors remain free or are arranged in such a way that the inflow of the functionalisable particle foam particles is not obstructed.

Step 5: Process Sequence

The mould filled with the functionalisable particle foam particles is now brought to the required process temperature by means of the temperature control device already described. The duration of the heating depends largely on the particle foam used and the maximum wall thickness of the moulded part. Once the required core temperature has been reached, which can be measured inside the moulded part using temperature probes if necessary, the mould is cooled to a demoulding temperature of approx. 40° C. to 80° C.

Step 6: Demoulding

After reaching the demoulding temperature, the mould is opened and the moulded part usually remains in the so-called bonnet part of the mould. The moulded part is then removed either manually or with the aid of suction and removal devices, such as handling robots. Mechanical demoulding via a special ejector function of the filling injectors is also possible. The moulded part can be processed immediately. Further process steps are not necessary.

FIGS. 15 to 23 show a general production sequence.

Figure 15:
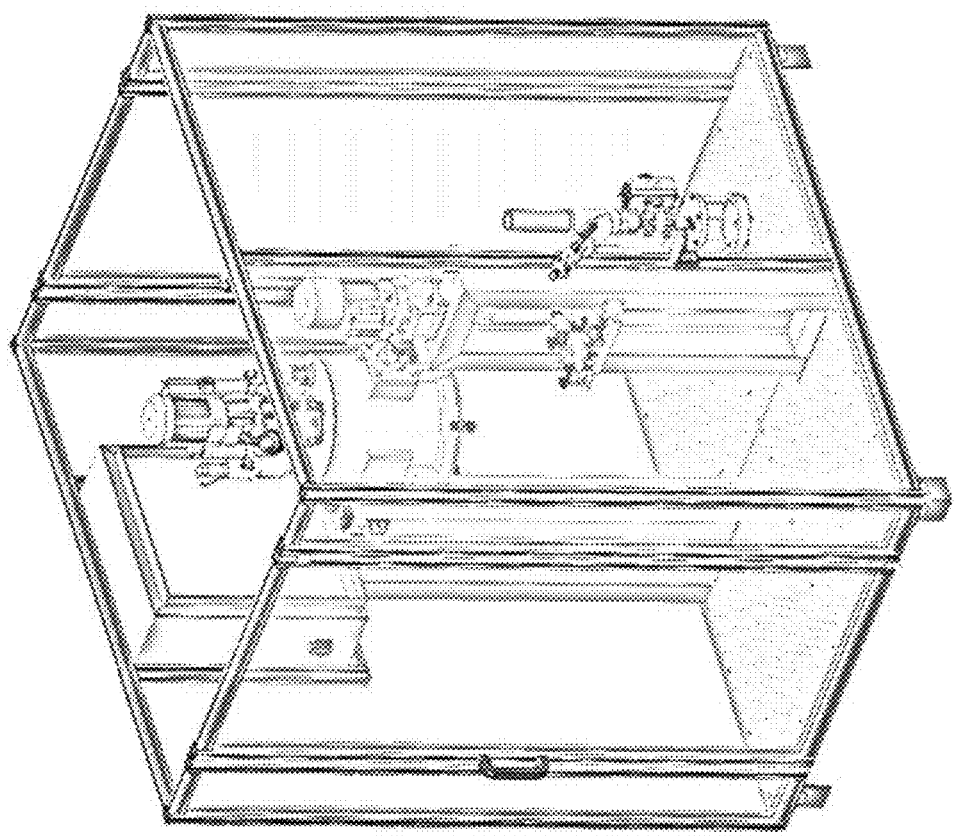
Figure 16:
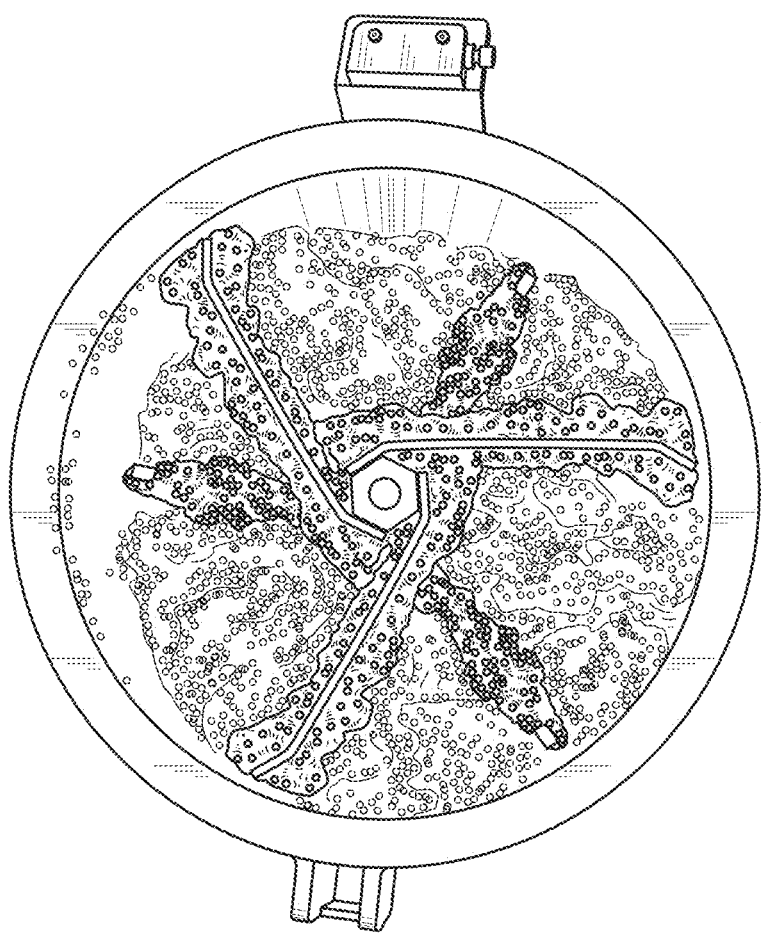
Figure 17:
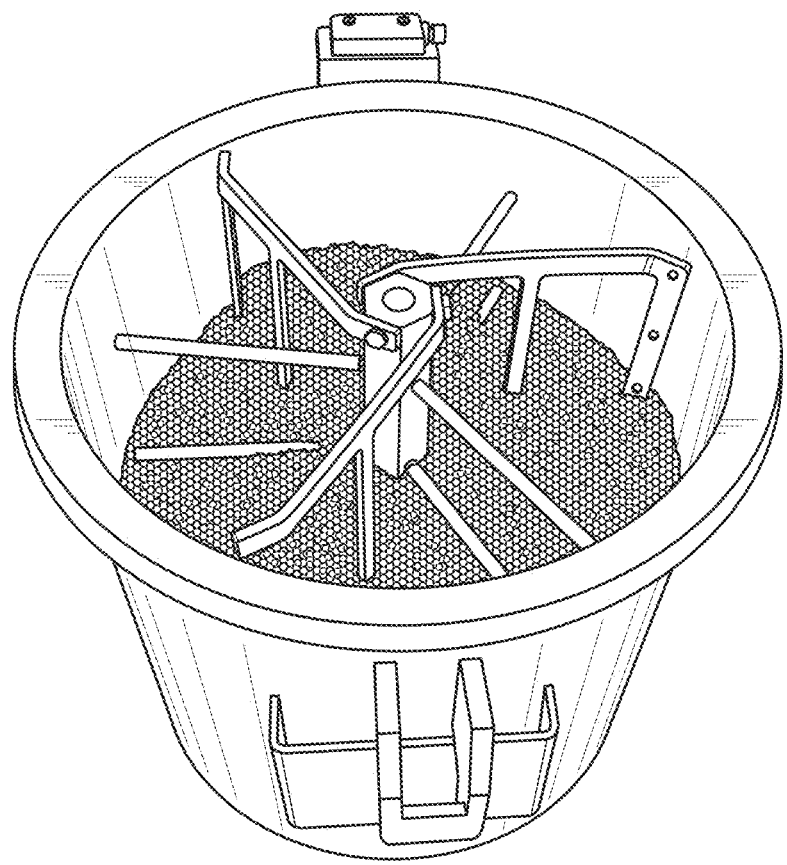

FIG. 15 shows a schematic representation of a suitable, fully automatic mixing device. In contrast, FIG. 16 shows a photographic image of a semi-automatic mixing device in which the particle foam particles and activator are already mixed but not yet dried. FIG. 17 then shows a photographic image of the semi-automatic mixing device in which the particle foam particles and activator are mixed and dried. The free-flowing functionalisable particle foam particles can now be removed.

Figure 18:
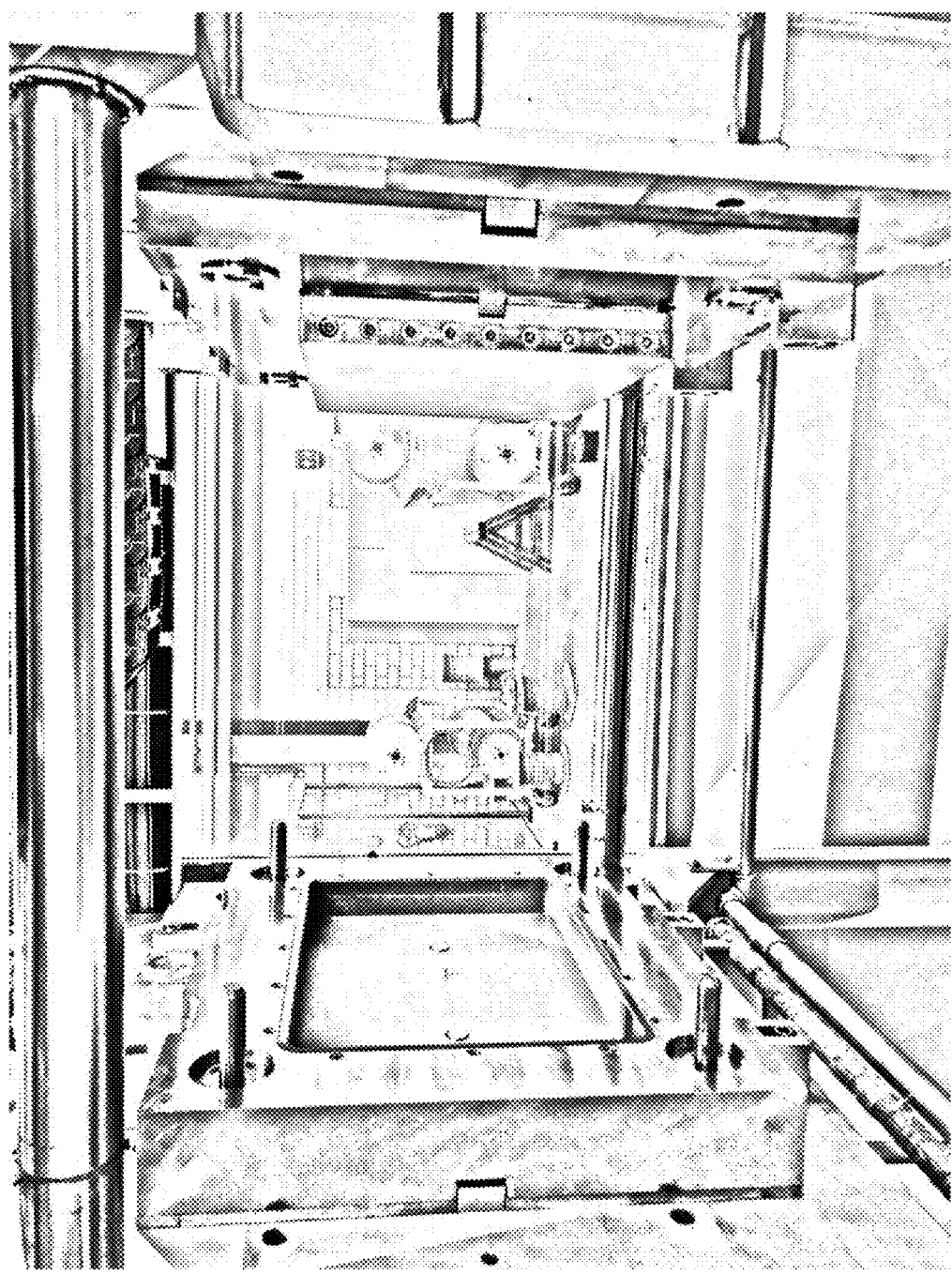

FIG. 18 shows a photographic image of an open mould installed on the prepared machine. The (green) mould surface is due to the non-stick coating with Teflon. On the right half of the mould, the closed deep holes of the indirect tempering are clearly visible.

Figure 19:
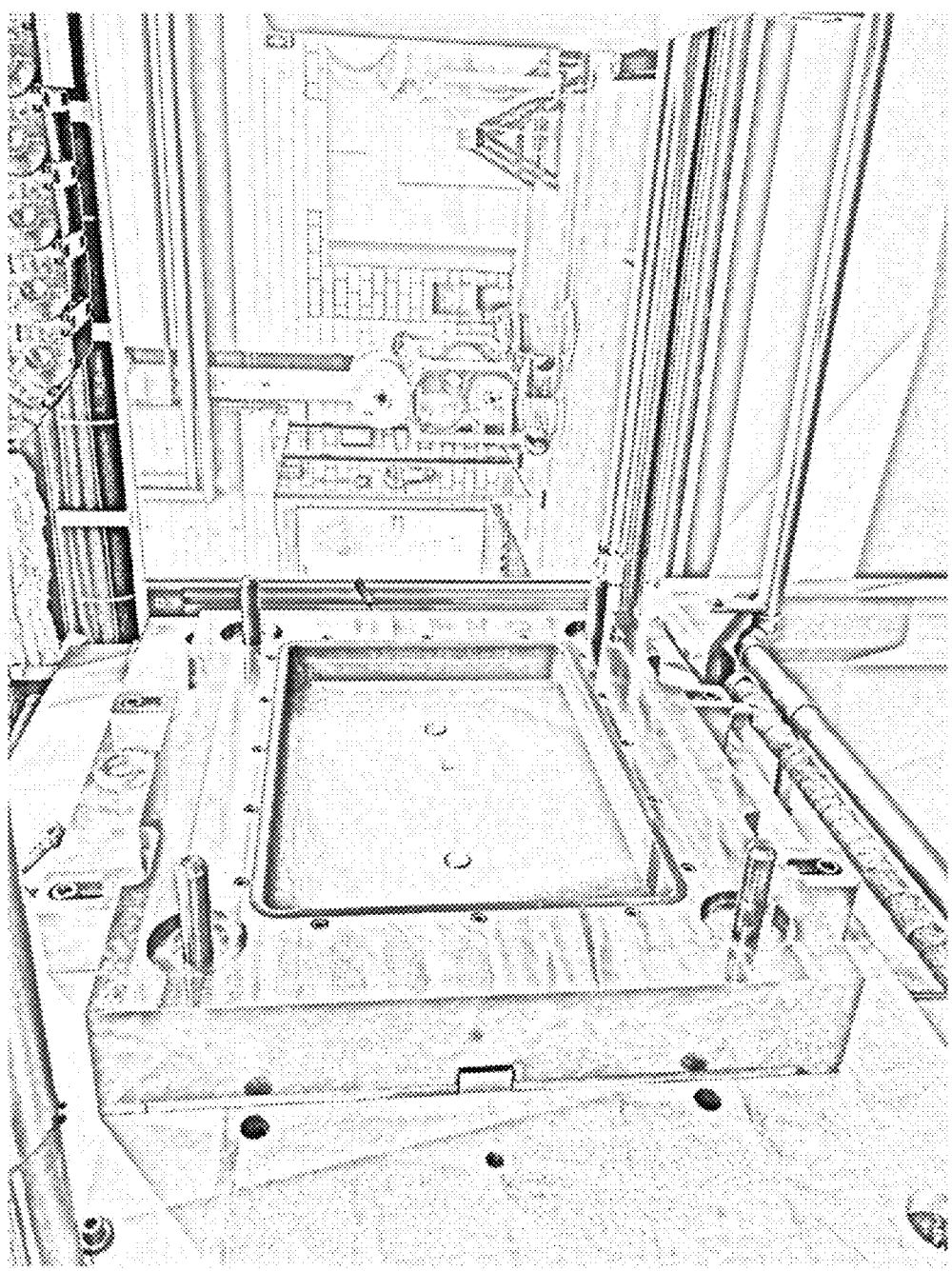

FIG. 19 shows a photographic image of the bonnet side of the mould. The two filling injectors and the completely closed mould surface can be seen.

Figure 20:
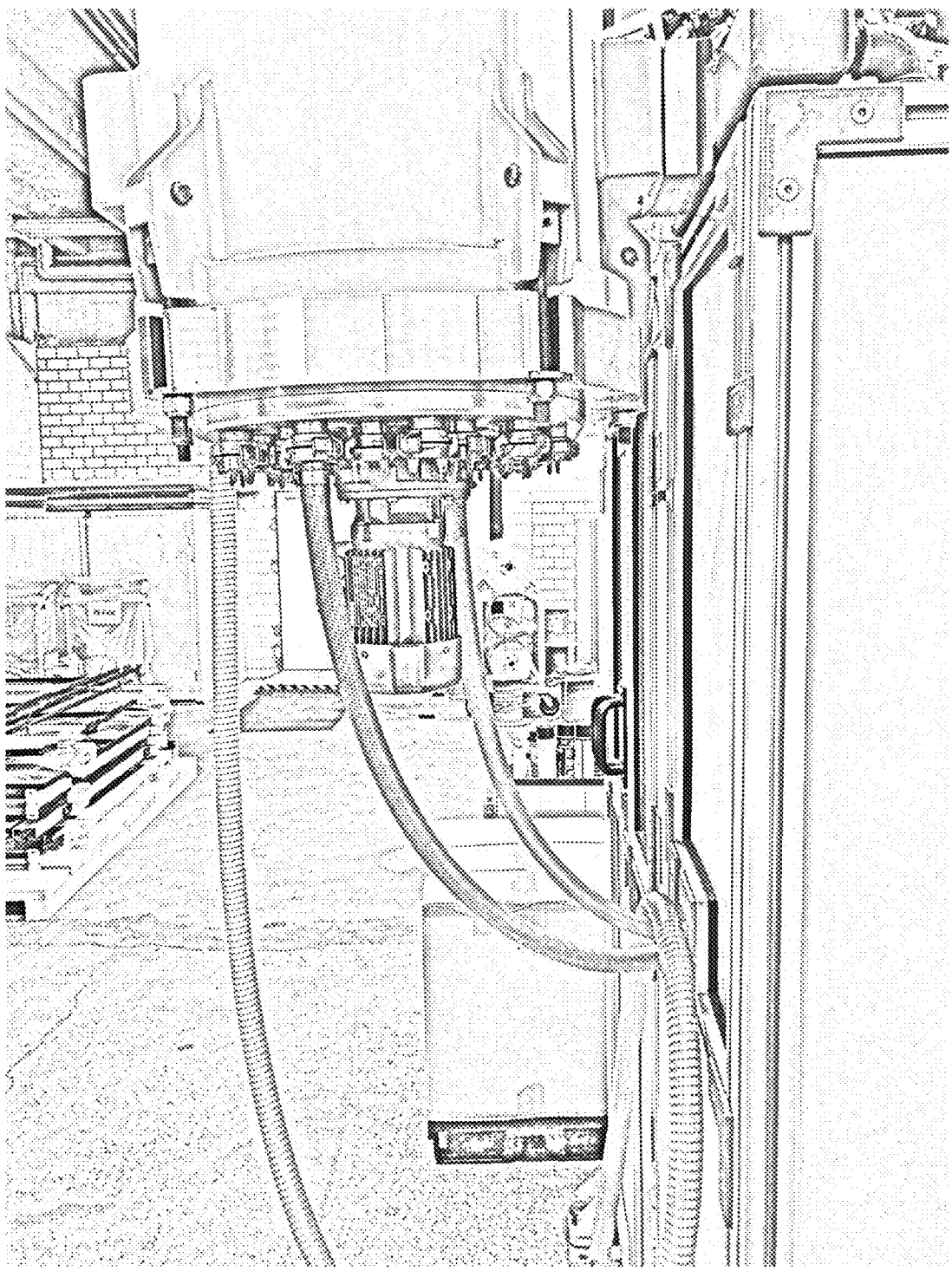
Figure 21:
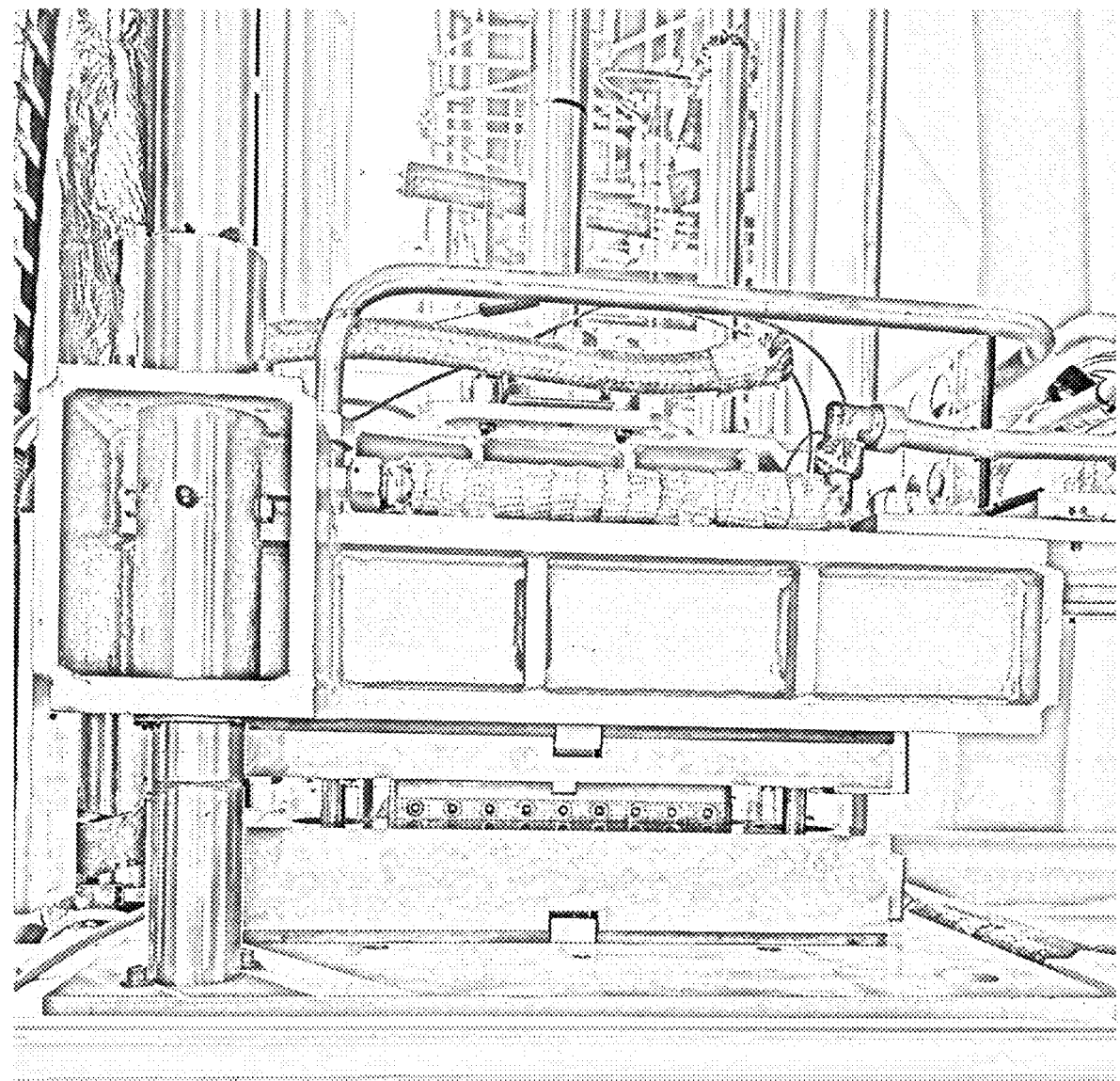

A photographic image of a filling device is shown in FIG. 20. The functionalisable particle foam particles are in the pressure vessel. The partially transparent pressure hoses guide the functionalisable particle foam particles in the process to the filling injectors. FIG. 21 shows a photographic image of the closed mould.

Figure 22:
Figure 23:
FIG. 23 is a photographic image of a mould opened after the process.

After the process, the mould is opened. FIG. 22 shows a photographic image in which the particle foam moulding formed is, as an example, a black EPP that is still in the bonnet side. In a very similar manner, FIG. 23 shows a photographic image in which the particle foam moulding formed is, by way of example, white EPS that is still in the bonnet side.

Figure 24:
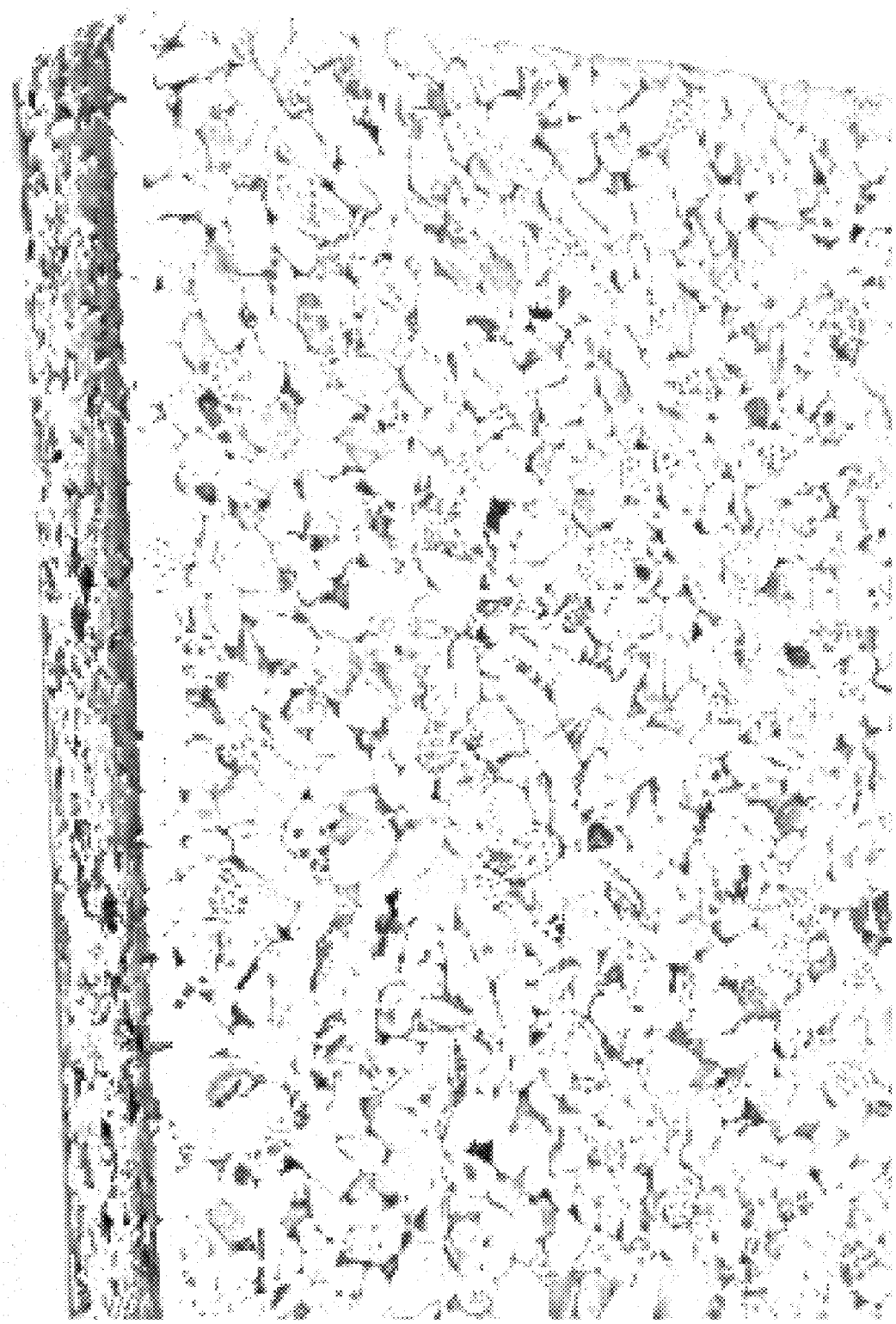
FIG. 24 is a photographic image of a particle foam moulding made of foamed maize granulate produced by the process according to the invention in a top view.
Figure 25:
FIG. 25 is a photographic image of a sectional view of the foamed maize particle foam moulding shown in FIG. 24.
Figure 26:
FIG. 26 is a photographic image of a particle foam moulded part made of foamed maize granulate with embedded power cable in a sectional view produced by the process according to the invention, FIG. 27 a photographic image of aluminium blocks bonded with the aqueous AMP emulsion according to the invention, FIG. 28 a photographic image of stainless steel parts bonded with the aqueous AMP emulsion according to the invention, FIG. 29 a photographic image of brass rings bonded with the aqueous AMP emulsion according to the invention, FIG. 30 a photographic image of steel bolts bonded with the aqueous AMP emulsion according to the invention.

FIGS. 24 to 26 show, as already mentioned above, the further range for using the aqueous AMP emulsion according to the invention, in which, in this embodiment, a foamed maize granulate can be processed into particle foam mouldings. The process is essentially the same as for particle foams made of plastics. Dimensionally stable and mechanically solid particle foam mouldings are also obtained here, as can be seen in FIGS. 24 and 25. In the embodiment shown in FIG. 25, an electric cable was embedded in the foamed corn granulate and subjected to moulding together with it.

In FIGS. 27 to 32, examples are given of very specific embodiments and uses in which metals are bonded together by means of the aqueous AMP emulsion according to the invention.

Figure 27:
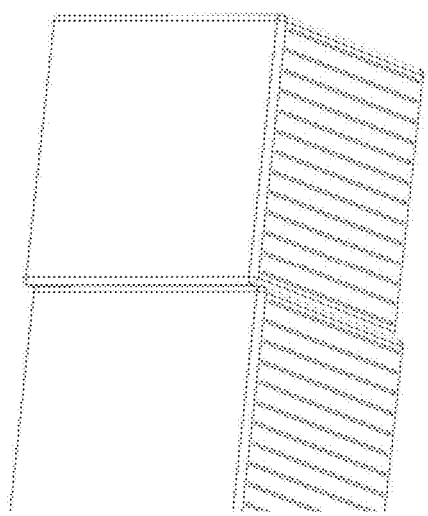

For example, in FIG. 27 it can be seen that two aluminium blocks have been bonded together in a way that would not be expected from the aqueous AMP emulsion according to the invention. The right of the two aluminium blocks is partially resting on a table top and is held there by hand, while the left aluminium block is free in the air and is only held by the connection according to the method of the invention.

Figure 28:
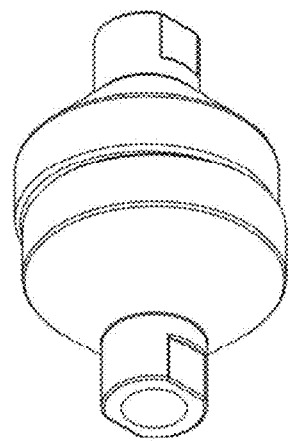
Figure 29:
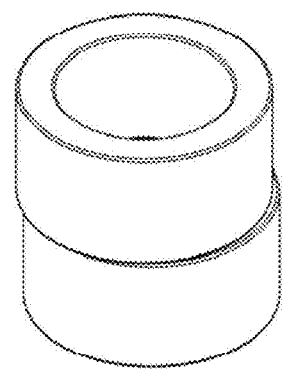

As a further example, for FIG. 28, two stainless steel parts have been joined with the aqueous AMP emulsion according to the invention, whereby here the holding hand is partially visible and the lower of the two stainless steel parts hangs freely and is only held by the joint according to the method according to the invention. Similarly, FIG. 29 shows the fixed connection of two brass rings to each other by the connection according to the method of the invention.

Figure 30:
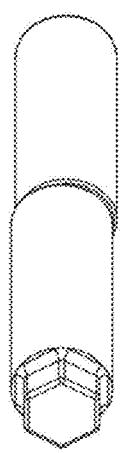

Furthermore, FIG. 30 shows two steel bolts connected to each other by the connection according to the method of the invention, whereby the left-hand steel bolt partially rests on a table top and is held there by hand, while the right-hand steel bolt is free in the air. Noteworthy here is the small connecting area between the two steel bolts compared to the other examples, against the background of the high density (weight) of the two parts.

Figure 31:
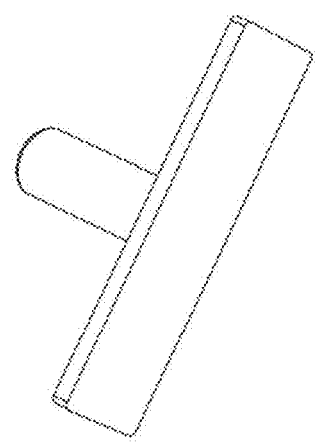
FIG. 31 a photographic image of steel and aluminium metal parts bonded with the aqueous AMP emulsion according to the invention, and FIG. 32 a photographic image of steel and brass metal parts bonded with the aqueous AMP emulsion according to the invention.
Figure 32:
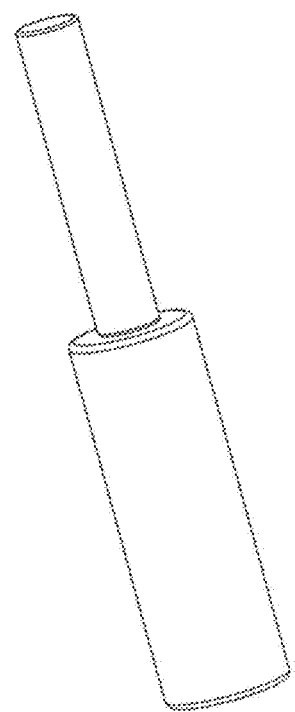

Finally, it is shown in FIGS. 31 and 32 that, according to the method of the invention, pairs of different metals can also be firmly joined together, in FIG. 31 the pairing of steel and aluminium, in FIG. 32 the pairing of steel and brass, whereby in the latter the heavier steel bolt hangs freely and is only held to the brass part by the connection according to the method of the invention.

The invention claimed is:

1. A process for the production of moulded parts from particle foams, comprising the steps of
    a) providing particle foam particles,
    b) wetting the particle foam particles with an aqueous emulsion of at least one polyolefin and thereby obtaining functionalisable particle foam particles,
    c) drying the wetted and functionalisable particle foam particles,
    d) shaping the functionalisable particle foam particles into shaped functionalisable particle foam particles,
    e) heating the shaped functionalisable particle foam particles to a temperature below the melting range of the particle foam particles and thereby functionalising the shaped functionalisable particle foam particles, wherein the particle foam particles are bonded together, and
    f) cooling and thereby obtaining the shaped particle foam particles, characterised in that the aqueous emulsion of the at least one polyolefin is an aqueous emulsion comprising at least one polyolefin converted to the liquid state with an anhydride of an unsaturated carboxylic acid and modified with methacrylic acid ester copolymers.

2. The process according to claim 1, wherein at least one epoxy-terminated silane is added to the aqueous emulsion of the at least one polyolefin converted to the liquid state with an anhydride of an unsaturated carboxylic acid and modified with methacrylic ester copolymers.

3. The process according to claim 2, wherein the addition of the at least one epoxy-terminated silane to the aqueous emulsion of the at least one polyolefin converted to the liquid state with an anhydride of an unsaturated carboxylic acid and modified with methacrylic ester copolymers takes place immediately before step b).

4. The process according to claim 1, wherein the aqueous emulsion is a chlorine-free aqueous emulsion of at least one polyolefin converted to the liquid state with maleic anhydride and modified with an acrylate resin.

5. The process according to claim 1, wherein at least one epoxy resin is added to the aqueous emulsion of the at least one polyolefin converted to the liquid state with an anhydride of an unsaturated carboxylic acid and modified with methacrylic acid ester copolymers.

6. The process according to claim 1, wherein the particle foam particles provided in step a) comprise two or more different particle foam materials.

7. The process according to claim 1, further comprising, before step d), the step of
    d0) providing a foreign material that forms a composite moulded part with the particle foam particles,
    wherein in step d) the shaping of the functionalisable particle foam particles is carried out in direct contact with the foreign material.

8. The process according to claim 1, wherein after step f) an already finished particle foam moulded part is joined to a further particle foam moulded part or provided with a foreign material, for which, analogously to step b), the aqueous emulsion of the at least one polyolefin converted into the liquid state with an anhydride of an unsaturated carboxylic acid and modified with methacrylic acid ester copolymers is applied to relevant surfaces of the parts to be joined together, these are dried according to step c) and then joined analogously to step d) before a composite to be produced is heated for joining according to step e) and cooled according to step f).

9. The process according to claim 1, wherein
    the shaping in step d) is carried out at least temporarily under mechanical pressure and/or
    the heating in step e) takes place without pressure.

10. The process according to claim 1, wherein
    in a modified step d), the shaping is carried out in individual layers and/or structures of functionalisable particle foam particles, and
    in a modified step e) heating is carried out with a locally focusable energy source so that the functionalisable particle foam particles in the individual layers or structures are bonded together, and
    in a modified step f) cooling is carried out by deactivating the locally focusable energy source so that a partial particle foam moulded part is initially obtained,
    wherein subsequently to the modified step f) in a step g) at least one further layer and/or a further structure of functionalisable particle foam particles is provided in contact with the partial particle foam moulded part,
    whereafter the modified steps d), e) and f) and step g) are repeated until a final particle foam moulded part is achieved.

11. A particle foam moulded part obtainable by the process of claim 1.

12. A method for the production of particle foam moulded parts, the method comprising:
    selecting a particle foam from thermoplastics; and
    applying to the particle foam a chlorine-free aqueous emulsion of at least one polyolefin comprising at least one polyolefin converted to the liquid state with an anhydride of an unsaturated carboxylic acid and modified with methacrylic acid ester copolymers.

13. The method according to claim 12, wherein the chlorine-free aqueous emulsion is an aqueous emulsion of at least one polyolefin converted to the liquid state with maleic anhydride and modified with an acrylate resin.

14. A method for the production of particle foam moulded parts, the method comprising:
    selecting particle foam is selected from natural renewable raw materials; and
    applying to the particle foam a chlorine-free aqueous emulsion of at least one polyolefin comprising at least one polyolefin converted to the liquid state with an anhydride of an unsaturated carboxylic acid and modified with methacrylic acid ester copolymers.

15. A method for permanent bonding of metallic surfaces, the method comprising: applying to a metallic surface a chlorine-free aqueous emulsion of at least one polyolefin comprising at least one polyolefin converted to the liquid state with an anhydride of an unsaturated carboxylic acid and modified with methacrylic acid ester copolymers.

* * * * *